United States Patent
Hartness et al.

(10) Patent No.: US 7,278,531 B2
(45) Date of Patent: Oct. 9, 2007

(54) FLEXIBLE CONVEYOR AND CONNECTION ELEMENTS

(75) Inventors: Thomas P. Hartness, Greenville, SC (US); William R. Hartness, III, Greenville, SC (US); Mark W. Davidson, Greer, SC (US)

(73) Assignee: Hartness International, Inc., Greenville, SC (US)

( * ) Notice: Subject to any disclaimer, the term of this patent is extended or adjusted under 35 U.S.C. 154(b) by 224 days.

(21) Appl. No.: 10/879,690

(22) Filed: Jun. 29, 2004

(65) Prior Publication Data

US 2005/0284735 A1    Dec. 29, 2005

(51) Int. Cl.
*B65G 47/84* (2006.01)
(52) U.S. Cl. .................. 198/470.1; 198/803.7
(58) Field of Classification Search ........ 198/849–853, 198/697, 470.1, 370.3, 803.7
See application file for complete search history.

(56) References Cited

U.S. PATENT DOCUMENTS

| | | |
|---|---|---|
| 766,329 A | 8/1904 | Cunning |
| 989,546 A | 4/1911 | Jensen |
| 1,058,096 A | 4/1913 | Phelps |
| 1,072,290 A | 9/1913 | Wood et al. |
| 1,073,067 A | 9/1913 | Ayars |
| 1,481,259 A | 1/1924 | Harrison |
| 1,538,406 A | 5/1925 | McCarty et al. |
| 1,583,767 A | 5/1926 | Akins et al. |
| 1,636,421 A | 7/1927 | Knott |
| 1,883,007 A | 10/1932 | Sheel |
| 1,892,463 A | 12/1932 | Gray |
| 1,933,551 A | 11/1933 | Gaynor |
| 1,942,885 A | 1/1934 | Tevander |
| 2,258,717 A | 10/1941 | Read |
| 2,270,709 A | 1/1942 | Pittahuga |
| 2,277,688 A | 3/1942 | Cattonar et al. |
| 2,350,692 A | 6/1944 | Milek |
| 2,611,524 A | 9/1952 | Taylor |
| 2,666,564 A | 1/1954 | Minard |
| 2,671,588 A | 3/1954 | Vogt |

(Continued)

FOREIGN PATENT DOCUMENTS

DE       2153078       10/1971

(Continued)

OTHER PUBLICATIONS

Posimat Universal Puck Screen Shot, Jul. 19, 2004.

(Continued)

*Primary Examiner*—Douglas A Hess
(74) *Attorney, Agent, or Firm*—Dority & Manning PA

(57) ABSTRACT

A conveyor is disclosed suitable for conveying objects along a transport direction. The conveyor includes a plurality of links, each link having a length extending across the direction of transport and a width extending along the direction of transport. Each link has a conveying surface for conveying one or more of the objects. Connection elements connect the links so as to form a conveyor. The connection elements include a flexible cable attached to the links at given intervals. The links are configured so as to be removably attachable to the cable. Various modifications and options are possible. Also, related article handling systems, including container handling and/or filling systems are also disclosed, suitable for use with various conveyor designs.

22 Claims, 22 Drawing Sheets

U.S. PATENT DOCUMENTS

| | | |
|---|---|---|
| 2,723,790 A | 11/1955 | Spiess, Jr. et al. |
| 2,730,279 A | 1/1956 | Enock |
| 2,760,316 A | 8/1956 | Okulitch et al. |
| 2,766,635 A | 10/1956 | Schwarzkopf |
| 2,890,553 A | 6/1959 | Day et al. |
| 2,921,425 A | 1/1960 | Seval |
| 2,928,693 A | 3/1960 | Cannon, Jr. |
| 3,012,811 A | 12/1961 | Sandrock |
| 3,028,713 A | 4/1962 | Kennedy et al. |
| 3,067,863 A | 12/1962 | Schwinger |
| 3,125,370 A | 3/1964 | McGill |
| 3,168,123 A | 2/1965 | Pellerino et al. |
| 3,308,928 A | 3/1967 | Mosterd |
| 3,505,787 A | 4/1970 | Tiews |
| 3,519,108 A | 7/1970 | Webb et al. |
| 3,553,927 A | 1/1971 | Anglade, Jr. |
| 3,553,932 A | 1/1971 | Rowekamp |
| 3,555,770 A | 1/1971 | Rowekamp |
| 3,555,773 A | 1/1971 | Rowekamp |
| 3,590,982 A | 7/1971 | Banyas |
| 3,608,700 A | 9/1971 | Nilsson |
| 3,648,427 A | 3/1972 | Raudat et al. |
| 3,656,517 A | 4/1972 | Taylor et al. |
| 3,664,491 A | 5/1972 | Scanlon et al. |
| 3,703,954 A | 11/1972 | Gudmestad |
| 3,727,366 A | 4/1973 | Schlueter et al. |
| 3,742,989 A | 7/1973 | Campbell et al. |
| 3,747,737 A | 7/1973 | Brooke |
| 3,754,637 A | 8/1973 | Carter et al. |
| 3,771,284 A | 11/1973 | Boeckmann et al. |
| 3,777,877 A | 12/1973 | Piper |
| 3,794,315 A | 2/1974 | Kaneko et al. |
| 3,805,476 A | 4/1974 | Kawamura et al. |
| 3,818,785 A | 6/1974 | Wakabayashi |
| 3,825,980 A | 7/1974 | Moore |
| 3,826,293 A | 7/1974 | Cayton |
| 3,854,574 A | 12/1974 | Theijsmeijer et al. |
| 3,856,059 A | 12/1974 | Hartness et al. |
| 3,858,709 A | 1/1975 | Banyas et al. |
| 3,860,104 A | 1/1975 | Strauss |
| 3,864,890 A | 2/1975 | Ullman |
| 3,881,592 A | 5/1975 | Stimpson |
| 3,910,404 A | 10/1975 | Henrekson |
| 3,938,847 A | 2/1976 | Peyton |
| 3,944,058 A | 3/1976 | Strauss |
| 3,949,859 A | 4/1976 | Nussbaumer et al. |
| 3,958,685 A | 5/1976 | McDonald et al. |
| 3,971,190 A | 7/1976 | McGill |
| 3,990,209 A | 11/1976 | Eisenberg |
| 3,992,766 A | 11/1976 | Field |
| 4,018,325 A | 4/1977 | Rejsa |
| 4,033,862 A | 7/1977 | Spencer et al. |
| 4,053,003 A | 10/1977 | Ferrero et al. |
| 4,055,943 A | 11/1977 | Reichert |
| 4,064,987 A | 12/1977 | Rowan |
| 4,068,882 A | 1/1978 | Van der Schoot |
| 4,096,939 A | 6/1978 | Riggs et al. |
| 4,106,612 A | 8/1978 | Koerner |
| 4,126,163 A | 11/1978 | Hartness et al. |
| 4,159,608 A | 7/1979 | Masuda et al. |
| 4,159,762 A | 7/1979 | Bulwith |
| 4,166,527 A | 9/1979 | Beezer |
| 4,169,621 A | 10/1979 | McGill |
| 4,171,738 A | 10/1979 | Lieberman |
| 4,172,514 A | 10/1979 | Shantz et al. |
| 4,183,428 A | 1/1980 | McGill et al. |
| 4,208,852 A | 6/1980 | Pioch |
| 4,215,521 A | 8/1980 | Hartness |
| 4,257,727 A * | 3/1981 | Peyton ............... 414/416.06 |
| 4,287,980 A | 9/1981 | Montferme |
| 4,291,733 A | 9/1981 | Polderman |
| 4,294,057 A | 10/1981 | Winiasz et al. |
| 4,300,330 A | 11/1981 | Hartness |
| 4,312,439 A | 1/1982 | Young |
| 4,320,914 A | 3/1982 | Simon |
| 4,335,761 A | 6/1982 | Peronek |
| 4,446,672 A | 5/1984 | Raudat |
| 4,457,121 A | 7/1984 | Johnson et al. |
| 4,467,847 A | 8/1984 | Zodrow |
| 4,483,436 A | 11/1984 | Krishnakumar et al. |
| 4,502,587 A | 3/1985 | Clark |
| 4,513,858 A | 4/1985 | Fellner et al. |
| 4,522,238 A | 6/1985 | Minard |
| 4,524,865 A | 6/1985 | Von Hofen |
| 4,528,796 A | 7/1985 | Lemaire |
| 4,530,433 A | 7/1985 | Cucchetto |
| 4,532,968 A | 8/1985 | Leonard |
| 4,533,038 A | 8/1985 | Richard |
| 4,541,524 A | 9/1985 | McGill et al. |
| 4,553,442 A | 11/1985 | Mazzorana |
| 4,567,919 A | 2/1986 | Fogg et al. |
| 4,585,369 A | 4/1986 | Manesse et al. |
| 4,587,792 A | 5/1986 | Hartness et al. |
| 4,588,001 A | 5/1986 | Leonard |
| 4,638,906 A | 1/1987 | Winiasz |
| 4,655,029 A | 4/1987 | Weiss |
| 4,678,077 A | 7/1987 | Bertorello |
| 4,697,691 A | 10/1987 | Zodrow et al. |
| 4,723,649 A | 2/1988 | Hartness et al. |
| 4,723,906 A | 2/1988 | Gibbemeyer |
| 4,746,007 A | 5/1988 | Houseman |
| 4,790,421 A | 12/1988 | Gorges |
| 4,793,261 A | 12/1988 | Schwaemmle |
| 4,807,421 A | 2/1989 | Araki et al. |
| 4,817,780 A | 4/1989 | Davidsson |
| 4,823,934 A | 4/1989 | Lemaire et al. |
| 4,835,946 A | 6/1989 | Hartness et al. |
| 4,856,144 A | 8/1989 | de Greef |
| 4,878,577 A | 11/1989 | Romero Lledo et al. |
| 4,888,936 A | 12/1989 | Takahama et al. |
| 4,901,844 A | 2/1990 | Palmaer et al. |
| 4,921,294 A | 5/1990 | Klopfenstein |
| 4,925,013 A | 5/1990 | Lapeyre |
| 4,934,517 A | 6/1990 | Lapeyre |
| 4,936,072 A | 6/1990 | Creed et al. |
| 4,953,687 A | 9/1990 | Gazzarrini |
| 5,004,097 A | 4/1991 | Roinestad et al. |
| 5,029,695 A | 7/1991 | Kovara |
| 5,035,270 A | 7/1991 | Herzog |
| 5,052,166 A | 10/1991 | Ziegler et al. |
| 5,072,573 A | 12/1991 | Tisma |
| 5,074,103 A | 12/1991 | McDowell |
| 5,115,901 A | 5/1992 | Santandrea et al. |
| 5,127,514 A | 7/1992 | Guttinger et al. |
| 5,170,546 A | 12/1992 | Harris |
| 5,174,430 A | 12/1992 | Ebira |
| 5,212,930 A | 5/1993 | Raudat |
| 5,219,065 A | 6/1993 | Hodlewsky et al. |
| 5,219,405 A | 6/1993 | Weiss |
| 5,257,888 A | 11/1993 | Kronseder |
| 5,285,884 A | 2/1994 | Polling et al. |
| 5,295,517 A | 3/1994 | Ahlers |
| 5,295,523 A | 3/1994 | Gentile |
| 5,313,764 A | 5/1994 | Kronseder |
| 5,392,896 A | 2/1995 | Martelli |
| 5,395,151 A | 3/1995 | Eberle |
| 5,400,894 A | 3/1995 | Smith |
| 5,427,227 A | 6/1995 | Crandall et al. |
| 5,429,227 A | 7/1995 | Krössmann et al. |
| 5,452,568 A | 9/1995 | Tisma |
| 5,477,659 A | 12/1995 | Conrad et al. |
| 5,487,257 A | 1/1996 | Domeier et al. |
| 5,487,461 A | 1/1996 | Focke et al. |
| 5,497,887 A | 3/1996 | Hiebert |

| | | | | | | |
|---|---|---|---|---|---|---|
| 5,501,253 | A | 3/1996 | Weiss | 6,474,464 B1 | 11/2002 | Horton et al. |
| 5,509,524 | A | 4/1996 | Ohmori et al. | 6,494,238 B1 | 12/2002 | Sindermann |
| 5,522,439 | A | 6/1996 | Håkansson et al. | 6,494,307 B1 | 12/2002 | Kozak et al. |
| 5,533,552 | A | 7/1996 | Ahlers | 6,520,316 B2 | 2/2003 | De Guglielmo et al. |
| 5,555,709 | A | 9/1996 | Savigny et al. | 6,533,103 B2 | 3/2003 | Hartness et al. |
| 5,558,200 | A | 9/1996 | Whitby et al. | 6,533,126 B1 | 3/2003 | Parsons |
| 5,581,975 | A | 12/1996 | Trebbi et al. | 6,571,532 B1 | 6/2003 | Wiernicki et al. |
| 5,588,282 | A | 12/1996 | Hartness | 6,581,653 B2 | 6/2003 | Servadei |
| 5,595,221 | A | 1/1997 | Lagneau | 6,601,697 B2 | 8/2003 | Steeber et al. |
| 5,603,399 | A | 2/1997 | Mannlein | 6,612,095 B2 | 9/2003 | Hartness |
| 5,611,418 | A | 3/1997 | Helmstetter | 6,612,567 B1 | 9/2003 | Kaya |
| 5,620,084 | A | 4/1997 | Mensch | 6,619,472 B2 | 9/2003 | Rehm |
| 5,642,604 | A | 7/1997 | Müller | 6,629,403 B1 | 10/2003 | Tisma |
| 5,657,615 | A | 8/1997 | Müller | 6,675,951 B2 | 1/2004 | Preti |
| 5,693,113 | A | 12/1997 | Dries et al. | 6,684,602 B2 | 2/2004 | Reinecke |
| 5,697,490 | A * | 12/1997 | Raque .................... 198/803.9 | 6,692,050 B2 | 2/2004 | Graffin |
| 5,701,719 | A | 12/1997 | Neukam | 6,722,101 B2 | 4/2004 | Hartness et al. |
| 5,722,655 | A | 3/1998 | Reist | 6,742,647 B2 * | 6/2004 | De Greef ................. 198/470.1 |
| 5,727,365 | A | 3/1998 | Lashyro et al. | 6,748,983 B2 | 6/2004 | Bausch |
| 5,768,860 | A | 6/1998 | Weaver | 6,761,264 B2 | 7/2004 | Steeber et al. |
| 5,775,067 | A | 7/1998 | Hawley | 6,772,876 B2 | 8/2004 | Spangenberg |
| 5,778,634 | A | 7/1998 | Weaver et al. | 6,905,012 B2 | 6/2005 | Lopes |
| 5,791,453 | A | 8/1998 | Schmits et al. | 7,021,453 B2 | 4/2006 | Hartness et al. |
| 5,797,249 | A | 8/1998 | Hartness | 7,036,658 B2 | 5/2006 | Hartness et al. |
| 5,810,151 | A | 9/1998 | Catelli et al. | 7,055,676 B2 | 6/2006 | Hartness et al. |
| 5,862,649 | A | 1/1999 | Benz | 7,055,677 B2 | 6/2006 | Hartness et al. |
| 5,865,225 | A | 2/1999 | Weiss | 2001/0002532 A1 | 6/2001 | Murphy et al. |
| 5,878,796 | A | 3/1999 | Phallen | 2001/0013459 A1 | 8/2001 | Pattantyus-Abraham et al. |
| 5,890,584 | A | 4/1999 | Bonnet | 2001/0027825 A1 | 10/2001 | Reinecke |
| 5,896,900 | A | 4/1999 | Haring et al. | 2001/0052216 A1 | 12/2001 | Hiramoto et al. |
| 5,915,524 | A | 6/1999 | Horlacher | 2002/0011400 A1 | 1/2002 | Burkhart et al. |
| 5,927,504 | A | 7/1999 | Han et al. | 2002/0060132 A1 | 5/2002 | Kloster et al. |
| 5,931,282 | A | 8/1999 | Maruyama et al. | 2002/0079199 A1 | 6/2002 | Wipf et al. |
| 5,947,262 | A | 9/1999 | Boring et al. | 2002/0139436 A1 | 10/2002 | Rosen et al. |
| 5,960,838 | A | 10/1999 | Tietz et al. | 2002/0139645 A1 | 10/2002 | Haubert et al. |
| 5,960,927 | A | 10/1999 | Bahr | 2002/0144880 A1 | 10/2002 | Ikemoto et al. |
| 5,975,159 | A | 11/1999 | Persenaire et al. | 2002/0150458 A1 | 10/2002 | Hartness |
| 5,975,280 | A | 11/1999 | Cote et al. | 2003/0000969 A1 | 1/2003 | Mie |
| 5,979,147 | A | 11/1999 | Reuteler | 2003/0000994 A1 | 1/2003 | Kyomasu et al. |
| 6,003,286 | A | 12/1999 | Goodman | 2003/0029700 A1 | 2/2003 | Miller |
| 6,026,867 | A | 2/2000 | Klarl | 2003/0037514 A1 | 2/2003 | Hartness et al. |
| 6,029,797 | A | 2/2000 | Olsson | 2003/0047427 A1 | 3/2003 | Spangenberg |
| 6,038,833 | A | 3/2000 | Beringer | 2003/0075547 A1 | 4/2003 | Stocchi |
| 6,050,060 | A | 4/2000 | Spatafora et al. | 2003/0106288 A1 | 6/2003 | Hartness et al. |
| 6,062,799 | A | 5/2000 | Han et al. | 2003/0106779 A1 | 6/2003 | Stocchi |
| 6,079,541 | A | 6/2000 | Bercelli et al. | 2003/0116222 A1 | 6/2003 | Spatafora |
| 6,112,885 | A | 9/2000 | Kuster et al. | 2003/0173186 A1 | 9/2003 | Hiramoto et al. |
| 6,119,440 | A | 9/2000 | Benner, Jr. et al. | 2004/0151842 A1 | 8/2004 | Humele |
| 6,119,848 | A | 9/2000 | Hartness, III et al. | 2005/0103603 A1 | 5/2005 | Hartness et al. |
| 6,141,943 | A | 11/2000 | Hart et al. | 2005/0103606 A1 | 5/2005 | Hartness et al. |
| 6,148,589 | A | 11/2000 | Fukui et al. | 2005/0269188 A1 | 12/2005 | Hartness et al. |
| 6,182,819 | B1 | 2/2001 | Rehm | 2005/0284537 A1 | 12/2005 | Hartness et al. |
| 6,185,910 | B1 | 2/2001 | Achhammer | 2005/0284735 A1 | 12/2005 | Hartness et al. |
| 6,186,314 | B1 | 2/2001 | Conklin, Jr. | 2006/0070850 A1 | 4/2006 | Hartness et al. |
| 6,209,293 | B1 | 4/2001 | Powers | | | |
| 6,209,716 | B1 | 4/2001 | Bogle et al. | FOREIGN PATENT DOCUMENTS | | |
| 6,220,444 | B1 * | 4/2001 | Calhoun ....................... 209/8 | DE | 4216721 A1 | 11/1993 |
| 6,234,300 | B1 | 5/2001 | De Vos et al. | DE | 19637624 A1 | 3/1998 |
| 6,237,750 | B1 | 5/2001 | Damkjaer et al. | EP | 0366067 A1 | 5/1990 |
| 6,253,809 | B1 | 7/2001 | Paradies | EP | 0471401 A2 | 2/1992 |
| 6,269,615 | B1 | 8/2001 | Amborn et al. | EP | 0711717 | 5/1996 |
| 6,276,409 | B1 | 8/2001 | Ellison | EP | 1061014 A1 | 12/2000 |
| 6,286,290 | B1 | 9/2001 | Fluck | EP | 1188692 A2 | 3/2002 |
| 6,321,897 | B1 | 11/2001 | Cassoni et al. | FR | 1195550 | 11/1959 |
| 6,334,473 | B1 | 1/2002 | Dumargue | GB | 513260 | 10/1939 |
| 6,334,526 | B1 | 1/2002 | Hatton | GB | 1264622 | 2/1972 |
| 6,341,630 | B2 | 1/2002 | Reinecke | GB | 1301335 | 12/1972 |
| 6,343,628 | B2 | 2/2002 | Reinecke | JP | 57085714 | 5/1982 |
| 6,343,690 | B1 | 2/2002 | Britton et al. | JP | 57209104 | 12/1982 |
| 6,354,427 | B1 | 3/2002 | Pickel et al. | JP | S6087111 | 5/1985 |
| 6,374,997 | B1 | 4/2002 | Spandafora et al. | JP | 7206123 | 8/1995 |
| 6,393,800 | B1 | 5/2002 | Schwenke | JP | 8120966 | 8/1996 |
| 6,474,368 | B2 | 11/2002 | Clusserath et al. | | | |

| | | |
|---|---|---|
| JP | 2002249215 | 9/2002 |
| MC | 35162328 | 5/1962 |
| WO | WO9529860 | 11/1995 |
| WO | WO 0051919 | 9/2000 |
| WO | WO 02092240 A1 | 11/2002 |

OTHER PUBLICATIONS

Patent Abstracts of Japan JP57085714, May 28, 1982.
Patent Abstracts of Japan JP57209104, Dec. 22, 1982.
Patent Abstracts of Japan JP07206123, Aug. 8, 1995.
Patent Abstracts of Japan JP08120966A, May 14, 1996.
Patent Abstracts of Japan JP 2000255736, Sep. 19, 2000.
Patent Abstracts of Japan JP 2002249215, Sep. 3, 2002.
PCT International Search Report and Written Opinion for PCT/US2004/037231, Apr. 25, 2005.
Internet Screen Print, Krones Filling Closing, et al., Jul. 5, 2002.
Pneumatic Scale Co Brochure, Easi-Flow Wine Filler, et al., Jan. 2001.
Internet Screen Print, US Bottlers Fillers, Jul. 5, 2002.
Internet Screen Print, Pneumatic Scale Co Capping Equipment, Filler Equipment and Seamers, Jul. 5, 2002.
Internet Screen Print, FOGG Filler Company—Products, Jul. 5, 2002.
FOGG Filler Company, The Fill Newsletter, vol. 1, Issue 2, Oct. 5, 2001.
Internet Screen Print, SIG Beverages—SIG Simonazzi, Jul. 5, 2002.
Internet Screen Print, KHS, Inc., Innofill, et al., Jul. 5, 2002.
Krones Brochure, Counter-Pressure Filler, Type VP Pneumatic Valve, Jul. 1994.

* cited by examiner

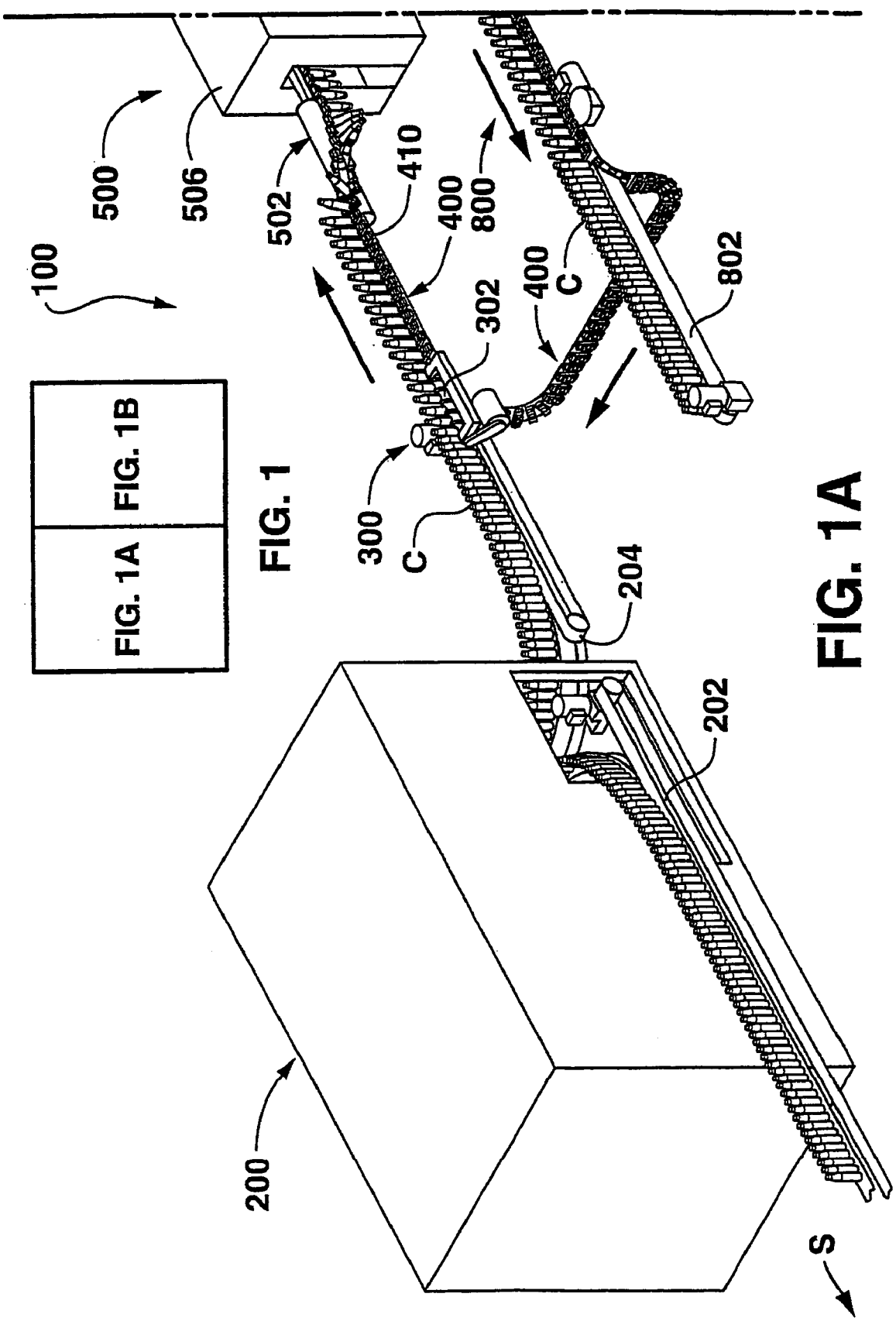

FLEXIBLE CONVEYOR AND CONNECTION ELEMENTS

FIELD OF THE INVENTION

The present invention relates generally to flexible conveyor designs and related components. More particularly, the invention relates to conveyor designs that include flexible connection elements between adjacent links. Other aspects relate to the connection elements themselves, as connectable to or guidable by conveyor links or other objects along a conveying system.

BACKGROUND OF THE INVENTION

Automated filling machines configured for filling any manner of container processed through the machine by a conveyor or the like are old and well known in the art. For example, a conventional high-speed filling machine typically uses a worm gear or screw-like device to orient and deliver containers (i.e., bottles) conveyed in single file and in contact with each other. The worm gear engages each container and spaces the containers apart a desired distance corresponding to the spacing of downstream filling valves. The containers are typically conveyed from the worm gear to a rotating star wheel that receives the containers in individual pockets or recesses. The star wheel may further convey the bottles to one or more additional star wheels, to a rotating table or platform of the filling machine, or may directly convey the bottles under the heads of the rotary filling machine. Examples of such filling machines are described, for example, in the following U.S. Pat. Nos. 2,666,564; 3,519,108; 4,053,003; 4,588,001; 6,253,809 B1; and 6,474,368 B2.

With the device according to U.S. Pat. No. 4,567,919, the containers are spaced apart on a conveyor by a pair of parallel screws and conveyed on the same conveyer directly to the filling valves of the rotary filler without the use of a star wheel.

U.S. Pat. No. 5,029,695 describes a star wheel having a plurality of circumferentially spaced orienting devices around its periphery. Each of the orienting devices includes moveable fingers which can readily assume the contour of different containers. However, the containers must still be indexed prior to being conveyed to the star wheel.

Conventional rotary filling machines of the type described above used in modern high-speed processing lines require relatively sophisticated drives, gearing, and control systems for ensuring precise coordinated movement between the different in-feed and out-feed star wheels, worm gears, and so forth. Also, the star wheel assemblies take up valuable floor space in use, as a typical star wheel may be, for example, 4 feet in diameter. Further, if different sized bottles are to be run through a given filler, extra star wheels are likely needed for each bottle size, and each bottle may require two or three different star wheels to stabilize different portions of a given bottle. The extra (unused) star wheels and/or sets of star wheels thus require a great amount of storage space. The star wheels also require maintenance and upkeep, and generally add to the overall cost of the filling operation.

Conventional rotary filling operations also generally process the containers in a single file or row through the filling machine, primarily due to the indexing functions of the worm gears and/or star wheels. To accomplish multiple parallel row filling operations with conventional star wheel indexing technology would require complicated and expensive gearing and drive arrangements and is not considered commercially viable. Multiple row filling is thus often provided by linear-type filling machines as described, for example, in U.S. Pat. No. 5,878,796. In this linear design, the containers are typically conveyed serially as a group into the filling machine and captured or indexed into position under filling nozzles or orifices. The containers are typically held fixed and motionless while they are filled. Once the containers are filled, the indexing mechanism releases the containers and the filled containers are conveyed out on the same conveyor and another grouping of containers in indexed into position for filling. The linear-type machines, however, also have drawbacks, particularly with respect to processing speed. The basic architecture of the rotary system design is clearly superior with respect to potential throughput of containers as compared to the linear systems. Also, the rotary systems make far more efficient use of floor space.

U.S. patent application Ser. Nos. 10/650,490 and 10/274,696, filed Aug. 28, 2003 and Oct. 21, 2002, respectively, and both assigned to the owner of the present application, disclose other rotary filling machines. Both of these applications disclose devices for filling multiple rows of containers that travel in a circular path around a filling machine. The disclosed designs are well-suited for their intended applications. In the designs of both applications, containers and/or filling heads are maneuvered in various ways when the containers near the filling heads so as to organize the containers into properly-spaced groups that correspond to the placement and spacing of filling heads. Doing so requires a certain amount of machinery and space. Also, in such systems the containers are at some points of travel not held fast to one part of the system machinery or another, potentially leading to toppling over or breaking of containers, as has been experienced with various other filling machines and systems over the years. Therefore, a need exists for a further improved simple and reliable system for moving containers securely through a filling machine and its related system parts, such as rinsers, labelers, etc.

Various types of conveyors have been utilized for conveying objects in industrial production lines. Objects may be conveyed from work station to work station individually or in groupings, depending on the object and the task to be performed. It may or may not be important to maintain any spacing or control of the objects during some or all of the travel. For example, apples being conveyed may simply be stacked randomly on a conveyor, while bottles being filled may be held rigidly in place by a filling machine that has received the bottles from a conveyor.

Certain conveyor belts (sometimes also called chains) are made of a plurality of interconnected links, driven by motors that engage the conveyor belt. Such conveying systems are commonly employed in the transportation of manufactured goods and articles, and for containers. With these typical systems, the motor drives a toothed drive sprocket that engages complimenting driving recesses or "dogs" formed on the conveyor belt. These drive units can be disposed in any number along the length of the conveyor belt. Such a drive unit and conveyor system is disclosed in U.S. Pat. No. 6,119,848 which is assigned to the assignee of the present invention, and is incorporated herein by reference in its entirety for all purposes.

Link type conveyor belts are sometimes designed having a knuckle/socket joint arrangement wherein one part of the link has a rounded knuckle and the opposite part has a socket formed by two extending edges. The knuckle of one link fits into the socket of a neighboring link. The knuckle is able to move in various directions within the socket, which allows for the conveyor system as a whole to curve and move.

The interconnected links typically have a platform member connected to or formed integral with the link's upper (conveying) surface. The platform member is generally shaped to match the neighboring platform members on other links such that the links can turn in a plane or twist while moving around curved sections of the conveying system, yet are also shaped such that the cracks and spaces formed between the links are minimized. The platform members can be connected to the links in several different ways. For instance, the platforms may have pegs extending therefrom which match corresponding slots on the links. Alternatively or additionally, the platforms can have snap springs which lock into place on corresponding sections of the links. Such a knuckle link with a platform surface member is disclosed in U.S. Pat. No. 6,209,716 which is owned by the assignee of the present invention and incorporated herein by reference in its entirety for all purposes.

While the conveyors disclosed in U.S. Pat. No. 6,209,716 work well for their intended applications, they are by their design inherently limited in terms of the amount of bending and twisting that they can do over a given distance. The interconnected knuckle links do beneficially afford a certain amount of three-dimensional curvature, but they also limit in some ways the layout of object conveying machinery according to the maximum amount of curvature possible between the knuckle links.

Finally, changing the dispensed liquid used in a given filler or changeout of filler heads and/or elements can be a complex task. In conventional fillers, the tanks, tubing, filler heads, seals, etc. must be cleaned in place. This can be time consuming, may require a large volume of the dispensed liquid to be wasted, and may require a substantial amount of water and/or cleaning fluid to be pumped through the system. Such change-out can be even more complicated for carbonated beverages. When switching from one dispensed liquid to another, different types of filler head and related structures may be required. In a rotary filler, this could mean changing out dozens of individual filler elements, each having multiple connections and seals, in place on the filler. Also, in a situation where a single filler element in a machine needs to be replaced, it can be a complex task to remove and replace the element in place. Thus, simpler filler structures and processes for allowing rapid change-out and/or cleaning would be welcome.

SUMMARY OF THE INVENTION

According to certain aspects of the invention, a conveyor is disclosed suitable for conveying objects along a transport direction, the conveyor including a plurality of links, each link having a length extending across the direction of transport and a width extending along the direction of transport, each link having a conveying surface for conveying one or more of the objects. Connection elements connect the links so as to form a conveyor, the connection elements including a flexible cable attached to the links at given intervals, the links being configured so as to be removably attachable to the cable.

The cable may be configured with a plurality of mounting members thereon at the given intervals, the mounting members being securable to the links to attach the links to the cable. If so, the mounting members may be cylindrical swages, the cable being slidable radially into a groove in the links so that swages enter a retaining portion of the grooves, or the cable being slidable longitudinally along a groove in the links so that the swages enter a retaining portion of the grooves. The links may include retainers for retaining the mounting members to the links. The retainers may be spring members slidable into a slot in the link, or may be pins slidable into an opening in the link.

The cable and links may be configured to allow three-dimensional movement of a given one of the links relative to an adjacent link. Also, the cable and links may be configured to allow twisting of at least about 180 degrees per foot of the cable.

Each link may include a link body. If desired, the connection elements may be connected to the link bodies, or the links may include intermediate members, the link bodies being attached to the intermediate members, the connection elements being removably attached to the intermediate members. The link bodies may be removably attachable to the intermediate members. The intermediate members may be substantially cylindrical pucks.

The conveyor may include a track, and the intermediate members include structure for guiding the links along the track. Alternatively, the links may include structure for guiding the links along a track through at least a portion of the travel of the links. The track may include a substantially T-shaped cross-section. The track may include opposed rails, may twist so as to invert the links, and/or may end adjacent a processing station, at which point the links depart the track and attach to the processing station. The processing station may be a filler.

The links may include attaching structure for attaching the links to at least one element along a filling system. The attaching structure may include cooperating elements disposed on each link and on a filler. The cooperating elements may include an arm disposed on each link and a plurality of openings disposed on the filler. The attaching structure may attach the conveyor to the filler so that conveyed objects are in registration with filler heads of a filler.

Each link may include at least one movable gripper for gripping a conveyed object. If the conveyed object is a container, and the conveyor may be configured to grip and hold the container with the container located substantially below the links.

The track may include an off ramp for transferring empty conveyed objects from the track to a processing station, and/or the track may include an on ramp for transferring fill conveyed objects from the a processing station onto the track.

According to other aspects of the invention, a conveyor is disclosed suitable for conveying objects along a transport direction, the conveyor including a track extending along a conveying path, and a plurality of links. Each link has a length extending across the direction of transport and a width extending along the direction of transport, and has a conveying surface for conveying one or more of the objects and each link defining mating structure for following the track along the conveying path. Connection elements connect the links so as to form a conveyor, the connection elements including a flexible cable having a plurality of mounting members thereon at given intervals, the links being removably attachable to the cable. As above, various options and modifications are possible.

According to other aspects of the invention, a conveyor is disclosed suitable for conveying containers along a transport direction to and from a filler, the conveyor including a track extending along a conveying path, the track being formed in at least two portions, a first portion terminating at an input section of the filler and a second portion beginning at an output section of the filler. A plurality of connected links is provided, each link having a length extending across the direction of transport and a width extending along the direction of transport. Each link has a conveying surface for conveying one or more of the containers, and each link defining mating structure for following the track along the conveying path and attaching structure for attaching the links to the filler. Flexible connection elements connect the links so as to form a conveyor. The mating structure is configured for guiding the links along the first track portion and to the filler, the attaching structure being configured for attaching the links to the filler for filling the containers, the mating structure being configured for guiding the containers off the filler and onto the second track portion after the containers are filled. As above, various options and modifications are possible.

DETAILED DESCRIPTION OF THE PREFERRED EMBODIMENTS

Figure 1B:
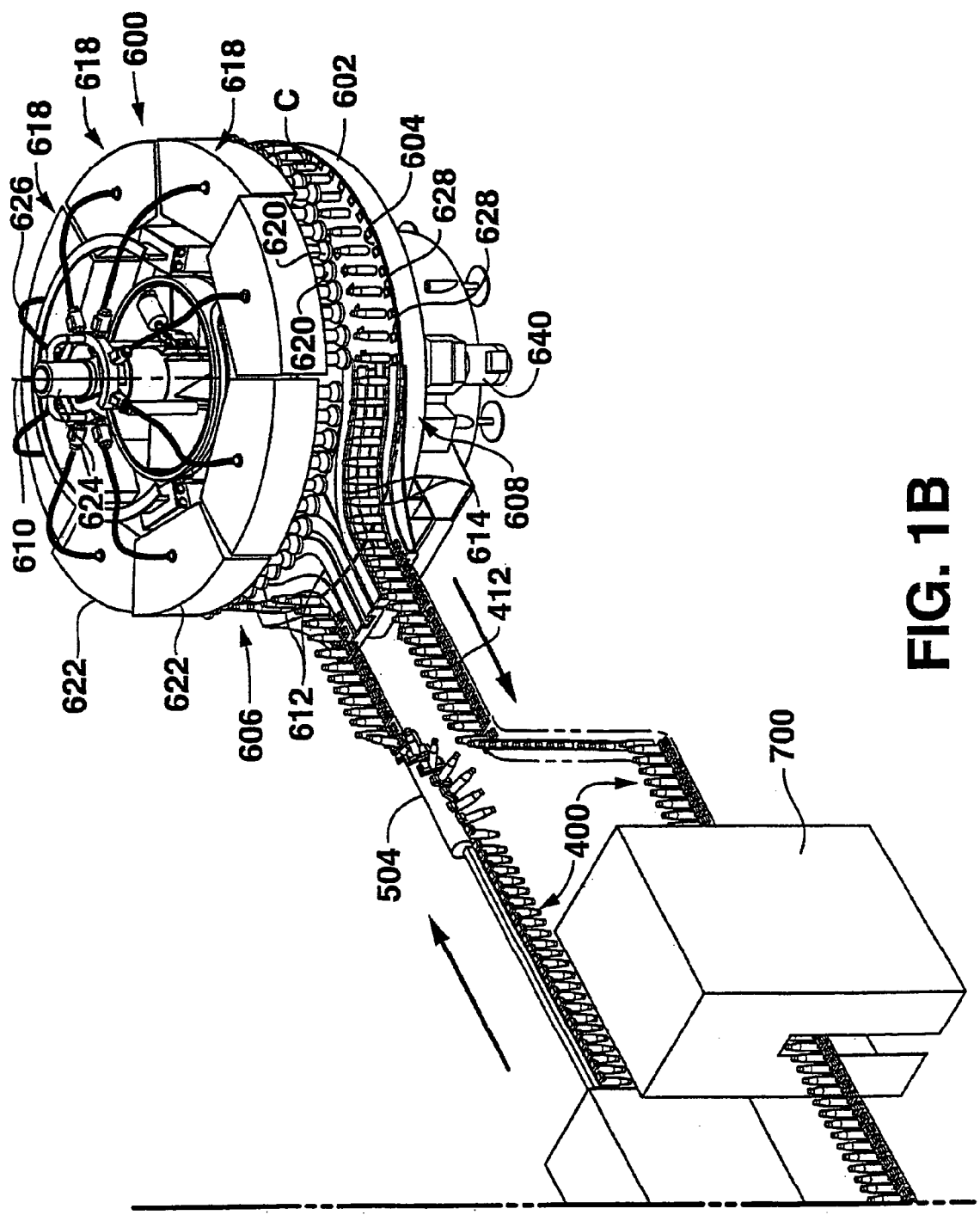
FIG. 1 (in parts FIG. 1A and FIG. 1B) is a perspective view of a conveying system and a conveyor incorporating certain aspects of the present invention.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations. In discussing various embodiments, like or similar reference numerals are used below with like or similar parts of various embodiments.

As shown in the various figures, embodiments of a flexible conveyor having links, and flexible connection elements for conveyors, along with their constituent parts, are disclosed. It should be understood that the present invention encompasses both a full conveyor structure made of individual links, connecting structures, and/or other components, and individual components for a conveyor including the connection elements and their components. Other aspects of the invention include the attachment or guidance of the conveyor or its component to links or to mating elements of a processing and/or filling system, as well as elements of a filler. The examples shown herein are for explanatory purposes only, and are not intended to limit the invention only to that shown and disclosed.

FIGS. 1A-10 show embodiments of a flexible conveyor having links, and potential use of such conveyor with a container processing system, including a rotary filler. The present invention includes various aspects of this complete disclosure. For example, aspects of the conveyor itself, the attachment of connection elements of the conveyor to links, the interaction of the conveyor with the track, the interaction of the conveyor with the filler, the interaction of the conveyor with the entire system, and others, all embody aspects of the present invention. As shown broadly in FIG. 1 (divided into a left-hand section FIG. 1A and a right-hand section FIG. 1B), an article conveying system 100 is shown. Broadly speaking, system 100 may include numerous portions of an article conveying system, such as a system for filling containers. As shown in FIG. 1, system 100 may include an accumulator 200 having an accumulator infeed conveyor 202 and an accumulator outfeed conveyor 204. A transfer station 300 may be provided for transferring containers C from accumulator outfeed conveyor 204 to main conveyor 400. As shown, transfer station 300 may include a conventional screw mechanism 302 for spacing containers C so that the containers are in registry with links 410 of main conveyor 400. As shown in FIG. 19 and discussed below, a relatively short top gripping conveyor (not shown in FIG. 1A), such as is shown in FIGS. 11-18, may also be used as a part of transfer stations 300 and 800 to assist in transferring containers from conveyor 204 to conveyor 400. A rinsing station 500 is also provided including two inverter mechanisms 502 and 504. Filler station 600 is provided including a rotary filler 602. Downstream of filler station 600 is an additional processing station 700, which may be a capping station, labeling station, or the like. Finally, a transfer station 800 is provided downstream of the additional station for transferring containers C from main conveyor 400 to a system outfeed conveyor 802.

It should be understood that the above description of elements within FIG. 1 is one possible example of a conveying system suitable for use with the conveyors of the present invention. For example, if the system is a filling system, various stations could be added or omitted from the above. Accordingly, a molding station could be included, separate capping and labeling stations could be included, the rinsing station could be omitted, cartoning or packing stations could be added, etc. Thus, the present invention should not be considered to be limited to the particular filling system shown in FIG. 1. Furthermore, the invention has various utilities with systems that are not filling systems. For example, certain benefits of the invention could be achieved using the disclosed conveyors apart from an actual filling operation to process articles, which may or may not be containers. Thus, merely conveying articles, which may or may not be containers, from one location to another with spacing between articles has various applications. Further, conveying such articles with a known, predetermined spacing is also useful for certain applications. In these additional applications, filling is not necessary to the application.

The system could be used with an accumulator and rinser for empty containers, or with a capper and cartoner for full containers. Also, other sorts of conventional fillers could be used, and the disclosed conveyors need not be used with the filler for all aspects of the invention. Further, the system need not be used with containers at all, but could be used for conveying other objects.

Also, it should be understood that conveyor 400, which will be described in greater detail below, is shown as passing through rinsing station 500, filler station 600, and additional station 700 in a loop. It should be understood that more or fewer stations could be included within such loop.

Accumulator station 200 may comprise a spiral accumulator such as a DYNACS®, available from Hartness International, Inc., or any other available spiral, linear, or other type of accumulator device. It should be understood that use of an accumulator station 200 is not necessary according to all aspects of the invention, but the invention does provide certain benefits when used within a system having an accumulator station. As shown, accumulator station includes infeed conveyor 202 which provides the initial supply of containers to system 100.

Infeed conveyor 202 supplies containers from a source S that may comprise a storage or staging apparatus (not shown), or may supply containers more directly from a manufacturing apparatus such as a blow molding machine (not shown). Again, although certain benefits of the invention are provided by linking infeed container 202 to a container manufacturing apparatus, such use is not required according to all aspects of the present invention.

As shown, outfeed conveyor 204 receives containers from accumulator station 200 and conveys them to transfer station 300, where the containers are transferred to main (endless) conveyor 400. If an accumulator station 202 is not used, infeed conveyor 202 may also be eliminated or merged with outfeed conveyor 204, so that containers conveyed from source S are passed to transfer station 200 without entry into an accumulator.

For purposes of system 100, infeed and outfeed conveyors 202 and 204 may comprise any type of conventional conveyor, such as a knuckle conveyor attached to a platform member, which may be constructed as set forth in U.S. Pat. No. 6,601,697 or in various other ways. For example, instead of a knuckle conveyor, other types of conveyors, belts, or chains such as roller chains, or roller chains with attachments, could be used for infeed and outfeed conveyors 202 and 204. Also, any of the conveyor designs and options disclosed herein could be utilized. Typically, infeed and outfeed conveyors 202 and 204 would have side rails or some equivalent structure (not shown) for guiding the conveyed containers. Alternately, gripping conveyors such as those disclosed in U.S. patent application Ser. Nos. 10/712,405, 10/712,406, and 10/712,407, all filed Nov. 13, 2003, and U.S. patent application Ser. No. 10/806,806, filed Mar. 30, 2004, all assigned to the owner of the present application, could also be used for infeed and outfeed conveyors 202 and 204, if desired. Also, the designs of the above patent applications could also be used or adapted for conveyor 400, discussed in more detail below.

Transfer station 300 as shown functions to transfer containers from outfeed conveyor 204 to main conveyor 400. Transfer station 300 includes a conventional screw mechanism 302 for spacing containers along the conveying direction according to the spacing of further machinery, such as filling elements of filler station 600, as will be described below. Thus, the parameters of screw mechanism 302 (such as screw pitch, rotation speed) may readily be designed by one skilled in the art so as to space containers "on centers" of rinsing elements used to rinse out the containers, filling elements used to fill the containers, and/or capping elements used to cap the containers, if desired. Screw mechanism 302 may comprise one or more screws, available from Morrison Timing Screws, or any other conventional screw mechanism. As mentioned above, a top gripping conveyor such as is shown in FIGS. 11-18 may be added to that shown in FIG. 1A to assist in smoothly transferring conveyed objects from an upstream conveyor to a downstream conveyor near screw mechanism 302. (See FIG. 19.) Also, it would be possible to place transfer station 300 at the exit to accumulator station 200 and/or infeed conveyor 202 and/or adjacent source S, so as to convey containers more directly to main conveyor 400, if desired.

Rinsing station 500 as diagrammatically shown includes an inverter 502, a rinsing device 506, and an un-inverter 504. Main conveyor 400, as shown, holds containers as they travel through these elements of the system. Main conveyor 400 may be a gripping conveyor as disclosed in U.S. patent application Ser. Nos. 10/712,405, 10/712,406, and 10/712,407, all filed Nov. 13, 2003, and U.S. patent application Ser. No. 10/809,806, filed Mar. 30, 2004, all assigned to the owner of the present application. Main conveyor 400 is configured so that gripping members may positively grip containers in a fixed position along the conveying direction, spaced "on centers."

As shown, inverter 502 and un-inverter 504 are tracks that spiral through 180 degrees perpendicular to the conveying direction, to alter the orientation of the conveyed containers for rinsing or filling. Alternatively, inverter 502 and un-inverter 504 could invert the containers by passing main conveyor 400 around an arc along the conveying direction, such as in a high-in/low-out rinser, or a low-in/high-out rinser, as is shown.

Referring to FIGS. 2-5 in general, filler station 600 may include a rotary filler such as filler 602. It should be understood that method embodiments according to the invention are also depicted in the figures. The machine 602 and associated method are not limited to filling of any particular size or shape of container C. The containers C are illustrated in the figures as conventional long-necked bottles for purposes of illustration only. As will become evident, the filler 602 is particularly useful and well-adapted for filling various size and shape containers with relatively little reconfiguration of the machine.

In FIGS. 1A and 1B, for ease of illustration, a single main conveyor 400 is shown. However, as is made clear in other figures, two or more such conveyors may be utilized with filler 602. Thus, conveyor 400a (see FIG. 2) has been omitted from FIGS. 1A and 1B. If two main conveyors 400, 400a were used, additional corresponding parts of system 100 could also be doubled.

Filler 602 includes a rotating platform, generally 604 having an in-feed section 606 and an out-feed section 608. At the in-feed section 606, containers C are transferred via main conveyor 400 onto the rotating platform 604. Similarly, at the out-feed section 608, filled containers C are transferred from the rotating platform 604 via main conveyor 400. Thus, containers C do not leave conveyor 400 during filling; rather conveyor 400 is connected to and detached from platform 604 for filling.

Figure 2:
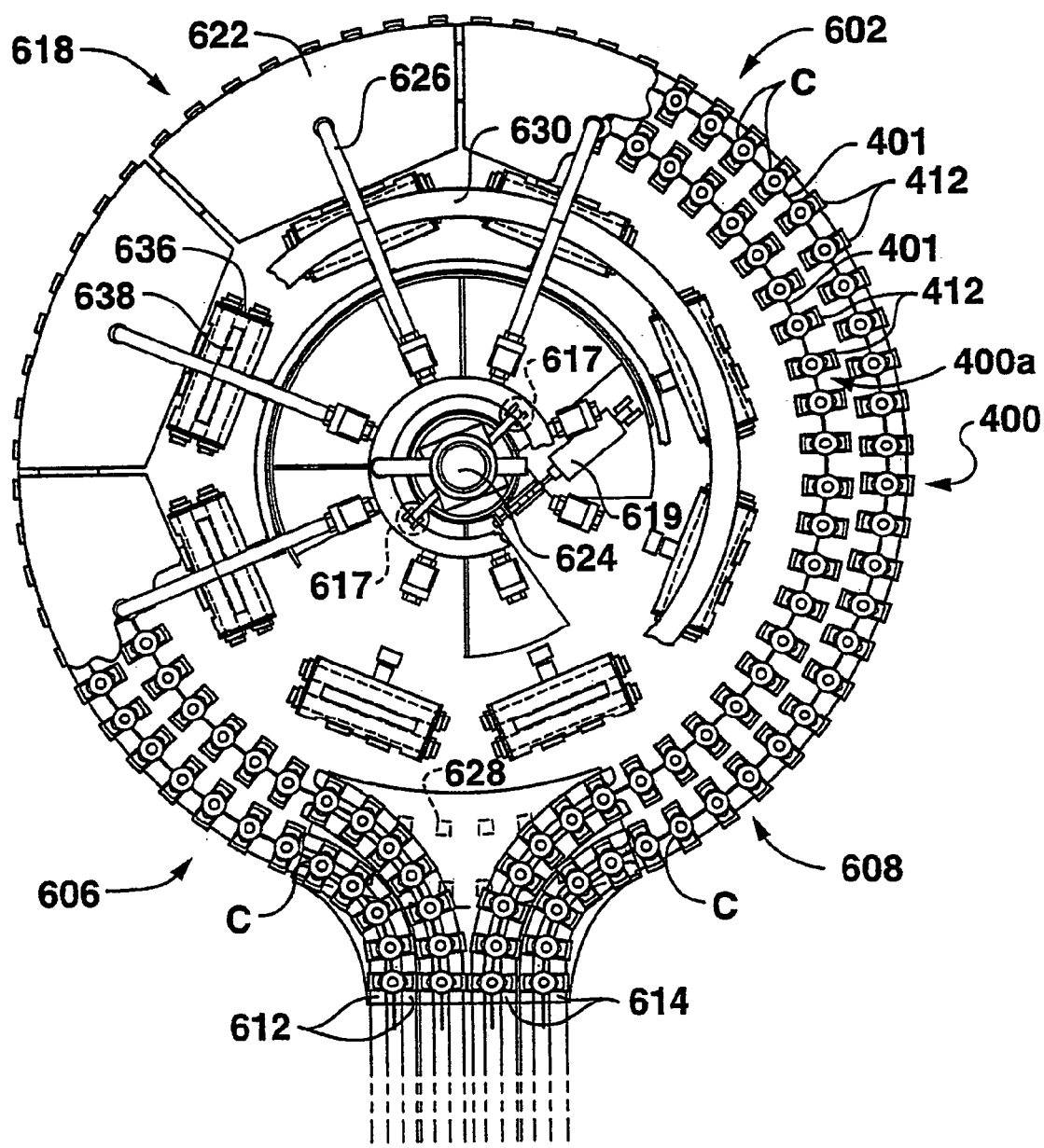
FIG. 2 is a top view of a filler station and conveyor of the system of FIG. 1.
Figure 3:
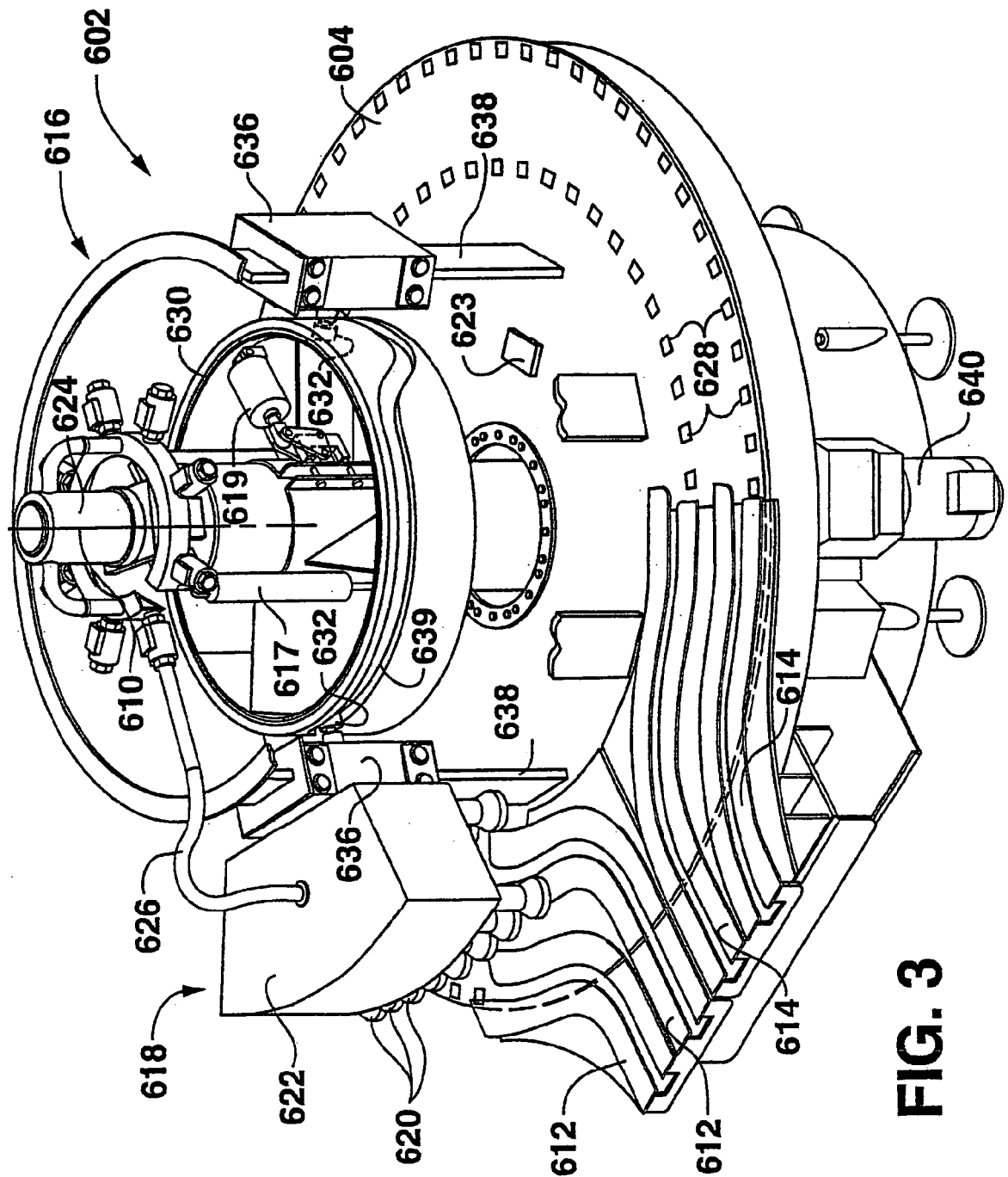
FIG. 3 is a perspective, partial view of the filler station of FIG. 2 without the conveyor links or conveyed objects.

In the illustrated embodiments, the rotating platform 604 is a generally circular rotating plate member, as particularly illustrated in FIG. 2. The rotating platform 604 rotates about a vertical axis 610 (FIG. 3). In this embodiment, an on-ramp 612 may be disposed at the in-feed 606 section to move conveyor 400 onto the rotating platform 604, and an off-ramp 614 may be disposed at the outfeed section 608 to move the conveyor off the rotating platform.

In an alternative embodiment not illustrated in the figures, the rotating platform 604 may be replaced by a circular portion of conveyor 400 including an extending circular track portion. Alternatively, platform 604 could have different shapes. It should be appreciated by those skilled in the art that various configurations of conveying systems may be utilized for practicing the invention, and that all such configurations are within the scope and spirit of the invention.

Figure 4:
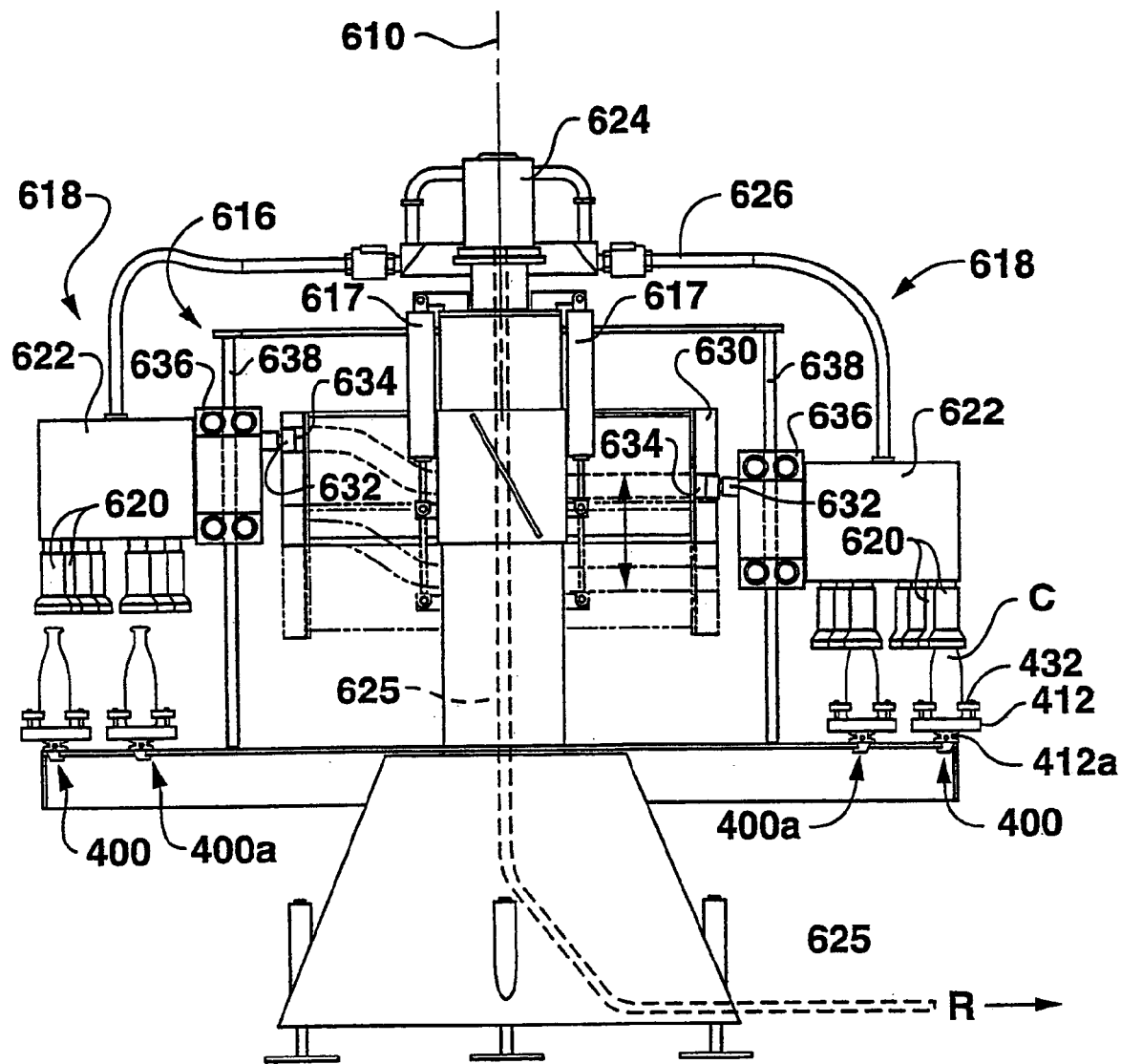
FIG. 4 is a partial end view of the filler station of FIG. 1 showing conveyor links and conveyed objects.

As shown in FIGS. 2-4, a filling turret 616 is disposed generally above the rotating platform 604 and rotates relative to the vertical axis 610 at a rotational speed that corresponds generally to that of the rotating platform 604. In this regard, the rotating turret 616 and platform 604 may be driven by a common drive mechanism, as described in greater detail below.

The filling turret 616 includes a plurality of radially disposed filling heads, generally 618, that are movable from a rest position relative to the containers C to a filling position wherein filling elements 620 engage with the containers C for a filling operation (see FIG. 4). In a particular embodiment, the filling heads 618 may be individually supplied and controlled. In the illustrated embodiments, the filling heads 618 are configured with respective groups of filling elements 620. Each filling head 618 includes an accumulator tank 622 in which a grouping of individual filling elements 620 are configured. Each accumulator tank 622 is in communication with a rotary gland 624 via flexible coupling hoses 626. Gland 624 is connected to a supply pipe 625, which is in turn in communication with central reservoir R (see FIG. 4). Referring to FIG. 2, the individual filling elements 620 in this particular embodiment are arranged in curved, parallel serial rows wherein the outer radial row contains a greater number of elements 620 as compared to the inner radial row. It should be appreciated that the number of elements in each of the rows will be a function of the circumferential spacing and size of the elements, as well as the radial placement of the elements 620 with respect to the axis 610.

As shown in FIGS. 1A and 1B only a single main conveyor 400 is shown. However, as indicated in the figures two such conveyors 400, 400a may be used if desired. Use of two main conveyors allows for nearly doubling the processing speed through the system without drastic change in diameter of filler 602, and allows for double row filling in the filler station 600. Thus, advantageously, a much smaller amount of floor space can be used to fill containers, as compared to two separate, side-by-side single file filler stations 600. However, it should be understood that a double file filler station is not required for all aspects of the present invention.

As discussed below, when a double file system is used like or similar reference numerals are used to identify like or similar elements in the dual rows. For clarity in the various figures, certain elements have been left out of the figures to better show underlying elements or relationships. For example, in FIG. 1B, links 412 are deleted about filler 602 so that the ramps 612 and 614, and the holes 628, and the registration of holes 628, containers C, and elements 620 can be better illustrated.

As shown in FIGS. 2-4, individual filling heads 618 can be raised and lowered by way of a rotary track 630 having a follower 632 riding in a groove 634. Interface 636 attached to follower 632 rides up and down on member 638. If desired, motorized, electronic, hydraulic elements (such as cylinder 617) may be applied to raise and lower turret 616 and accordingly all of heads 618, and similar elements (such as cylinder 619) may be used to properly position turret 616 around axis 610, for example to align filling elements 620 for filling containers C. A motor 640 powers rotation of the platform 604 and associated elements around axis 610. Various user-operated motor controls, such as Allen Bradley programmable logic controllers (not shown) as is known can be provided for motor 640. Also, an on-board computer or other controller 623 may be provided either rotationally mounted on platform 604, as shown in FIG. 3, or non-rotationally mounted to another portion of filler 602. Suitable electrical connections would also be provided, depending on the mounting position. Other conventional filler head moving mechanisms could also be used in conjunction with the disclosed rotating platform and main conveyor and associated elements, if desired. Thus, any and all such subject matter should be considered within the scope of the present invention.

Figure 5:
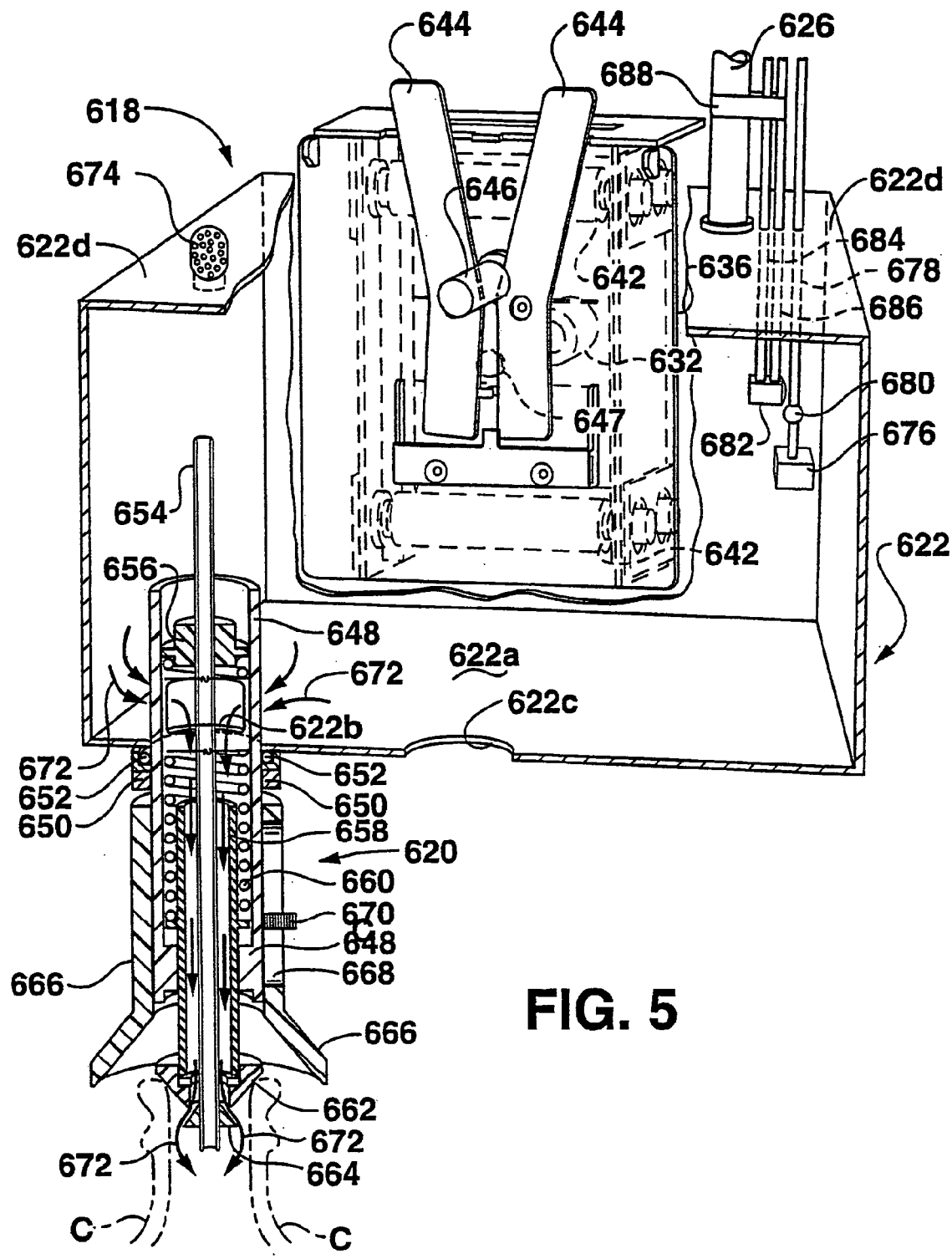
FIG. 5 is a partially broken-apart perspective view of a portion of the filler station of FIG. 1 showing one possible design for an accumulator tank and associated components.

FIG. 5 shows a diagrammatical (not to scale) example of elements within and attached to a given head 618. As shown, interface 636 includes rollers 642 that roll along contact member 638 as the interface rises and falls. Two pair of rollers 642 may be provided, although only one of each pair is shown in FIG. 5 for clarity. Two pivoting mounting arms 644 are provided on a radially outer portion of interface 636 for receiving an extending tab 646 extending from a radially inner portion of tank 622. Tab 646 slides into a mating opening 647 in interface 636 to mount head 618 to the interface. Tab 646 has slots in it sized for receiving mounting arms 644 so as to prevent tab 646 from withdrawing from opening 647 once mounted. Other mating or interlocking structures may also be used, if desired, for releasably securing head 618 to interface 636. Use of tab 646 and arms 644 allows for quick removal of an entire head 618 when desired.

FIG. 5 further shows a single filling element 620 mounted to bottom wall 622a of tank 622 via opening 622b. Two openings 622b and 622c are shown in a single row, although two or more rows of such openings could be provided for filling elements, if desired. Filling element 620 includes a body 648 mounted to wall 622a via a mounting clamp 650, which may be attached via a screw, pin, or the like to wall 622a. A seal such as an O-ring 652 is provided between wall 622a and body 648. A vent tube 654 is fixed to body 648 via a seal member 656. A fill tube 658 is slidably mounted around vent tube 654, and is urged downward (as shown) by a spring member 660. A first seal member 662 is attached to a bottom portion of fill tube 658, and a second seal member 664 is attached to a bottom portion of vent tube 654. Second seal member 664 acts to evenly spread liquids within container C during filling. Fill tube 658 may have a screen (not shown) disposed therein for further improving flow and retaining fluids when desired due to liquid surface tension. A centering cup 666 may be slidably mounted to body 648 for guiding container necks to contact seal member 662 for filling, as described below. Centering cup 666 may have one or more guide slots 668 for receiving an extension 670 from body 648 for guiding motion of the centering cup. Although not illustrated as such in FIG. 5 for purposes of clarity, centering cup 666 may simply hang on body 648 under the force of gravity unless lifted by contact due to interaction with a container, but spring loading is also possible.

During use of filler 602, when no container is present, filling head 618 is at a raised position and fill tube 658 is at a lowered position so that seal members 662 and 664 are in contact, thereby preventing flow of liquid out of filling element 620 through seal member 662. As filling head 618 is lowered by interaction of follower 632 riding in groove 634 of track 630, seal member 662 eventually comes into contact with the top of a container C. Centering cup 666 may contact container C during this process to assist in alignment. As head 618 drops further, it lifts sealing member 662 enough so that liquid in tank 622 may follow arrows 672 into container C. Filling may be accomplished by gravity fill, or with pressurized assistance if desired, with gasses being evacuated from container C substantially through vent tube 654. When the liquid level in container C reaches the bottom of venttube 654, evacuation of gas from the container effectively ceases, since liquid flow though fill tube 658 precludes most gas flow out of the container in that route. Thus, the container may be filled before filling head 618 is lifted so as to disengage the container.

It should be understood that other filling head designs and options could be used. Disclosed filling element 620 is a reliable gravity fill design that is easy to install and change out when desired. But it should be understood that various commercially available filling elements could be substituted for some aspects of the present invention.

An example of tank fill and venting systems are also schematically shown in FIG. 5. A release valve or vent 674 is shown on an upper wall 622d of tank 622. A float 676 with an attached positioning rod 678 and position indicator 680 are also provided. Float 676 rises or falls with the level of fluid in tank 622. A pneumatic or hydraulic valve 682 actuated by indicator 680 controls flow though fluid input line 684 and output line 686. Another pneumatic valve 688 controls flow of liquid into tank 622 through hose 626. Thus, when float 676 falls low enough for indicator 680 to actuate valve 682, valve 688 is also actuated, thereby causing fluid to flow into tank 622 and evacuated gas to exit through release valve 674. Quick disconnect fittings (not shown) may be used with hose 626 and lines 684 and 686 to improve the ease of changing filling heads, if desired. Any connected electronic equipment, sensors, controllers, etc., if used, should also include readily detachable connectors. Various other tank filling systems could alternatively be employed, including electronic sensors and valves, servomotors, etc. However, for such a wet system, use of the mechanical and pneumatic systems may avoid certain environmental issues with electronic parts and controls.

It should be understood, that tank 622 and related filling elements 620 may be modified from that shown, for example as set forth in U.S. patent application Ser. Nos. 10/650,490 and 10/274,656, filed Aug. 28, 2003 and Oct. 21, 2002, respectively, for some aspects of the present invention. Also, tank 622 may include one or more radial or circumferential partitions (not shown) creating distinct portions, with a separate liquid in each portion. Therefore, more than one type of liquid could be put into containers by one tank 622. If desired, an inner row of elements 620 could fill containers with one liquid on an inner conveyor and an outer row of elements could fill containers with another liquid on an outer conveyor. Of course, multiple hoses 626 and associated tank filling systems would be needed in such case. Also, it is possible that individual filling heads 618 dispense different liquids as well, and any number of individual heads could be used around filler 602.

The filling heads 618 are readily removable and replaceable by detaching the hose 626 and lines 684 and 686, opening arms 644, and then sliding tab 646 out of opening 647. At this point another filling head may be connected and filling continued. The removed filling head 618 may be cleaned apart from the filler while the new head is operating on the filler, substantially reducing down time for the filler.

Also, with this design, it is possible to make filling head 618 expandable or contractible, by adding or removing any number of filling elements 620 (and plugging the resulting openings). Thus, filler 602 could be modified between a one or two conveyor 400 and/or 400a system, with one or two liquids, as desired, with minimal modification to individual heads 618. Also, such modification could be accomplished by switching out whole filler heads 618, if spare elements are available.

Depending on-diameter of the filler 602, a single conveyor system may include as many as 60-100 individual filling elements 620. By utilizing a second conveyor, the number of elements 620 on filler 602 may be increased by about 80%. Thus, a two-conveyor filler may achieve rates as high as 150 containers per minute per foot of filler diameter (at heads). For an 8-foot diameter filler, the corresponding fill rate is on the order of about 1,200 containers per minute. It is expected that using the teachings of the present invention, even higher fill rates are possible in a two-conveyor system. Adding a third conveyor would again increase capacity, perhaps by 60% or more of the single conveyor capacity. Thus, various aspects of the present conveyor and filler designs can substantially increase filled container output without substantially or correspondingly increasing floor space required for the filler, its various components, and/or associated system components.

Figure 6:
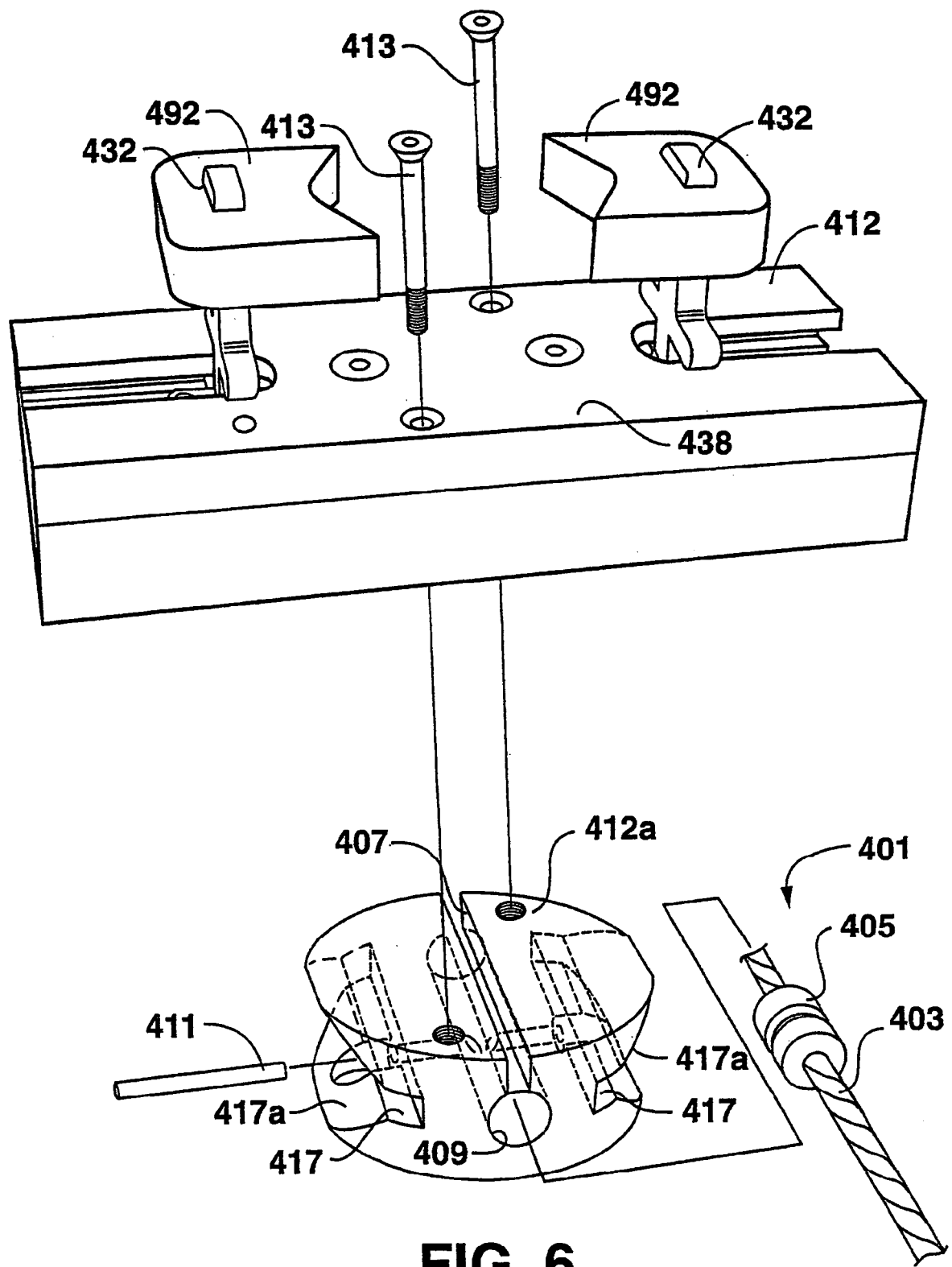
FIG. 6 is an exploded perspective view of one design for a portion of the conveyor of FIG. 1.
Figure 10:
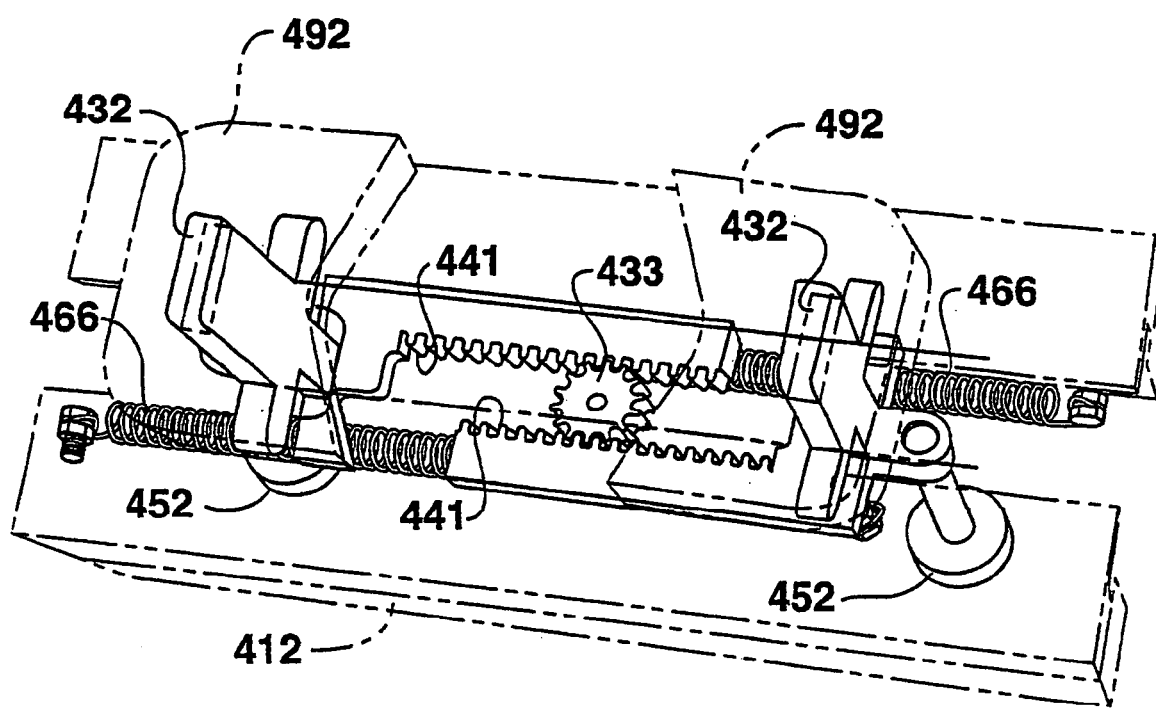
FIG. 10 is a partial perspective view of one possible internal mechanism for a link for a conveyor as in FIG. 1.

As shown in FIG. 6, with respect to main conveyor 400, such conveyor may be made of links 412 comprising extending bodies having opposed gripping members 432 and at least one spring member 466 (see FIG. 10). At least one of gripping members 432 may move toward the other to grip a container therebetween. Gripping members 432 may include adaptors 492 configured for gripping and centering a container with respect to link 412, so as to be able to hold container C in a position and registration with a filling element 620. Cam follower members 452 may be provided for opening gripping members 432 when desired. As shown in FIG. 10, gripping members 432 may be moved via a double rack and pinion arrangement with pinion 433 mounted for rotation relative to link 412 so as to allow racks 441 to move relative thereto in unison. However, it should be understood that various other designs of main conveyor links in which one or more gripping members 432 are moveable may be utilized according to the present invention.

As shown herein, spring members 466 urge gripping members 432 toward a closed position. However, the function of cam followers 452 and spring members 466 may be reversed so that the cam members urge gripping members 432 toward the closed position and the spring members urge the gripping members toward the open position. Thus, gripping members may contact a conveyed object C to hold the object during transport as the objects pass through the system, including filler station 600 or various other elements. Adjacent links 412 may be connected via connection elements such as a connecting member 401 (see FIGS. 6 and 9).

As disclosed herein, one embodiment of connecting member 401 includes a braided wire cable 403 made of stainless steel or any other suitable material, or the like with mounting members 405 secured to it at given intervals. The mounting members 405 may comprise cylindrical swages may of aluminum, stainless steel or any other suitable material or the like secured to cable 403 by a set screw, swaging, welding, braising, or any other reliable manner of attachment.

Figure 7:
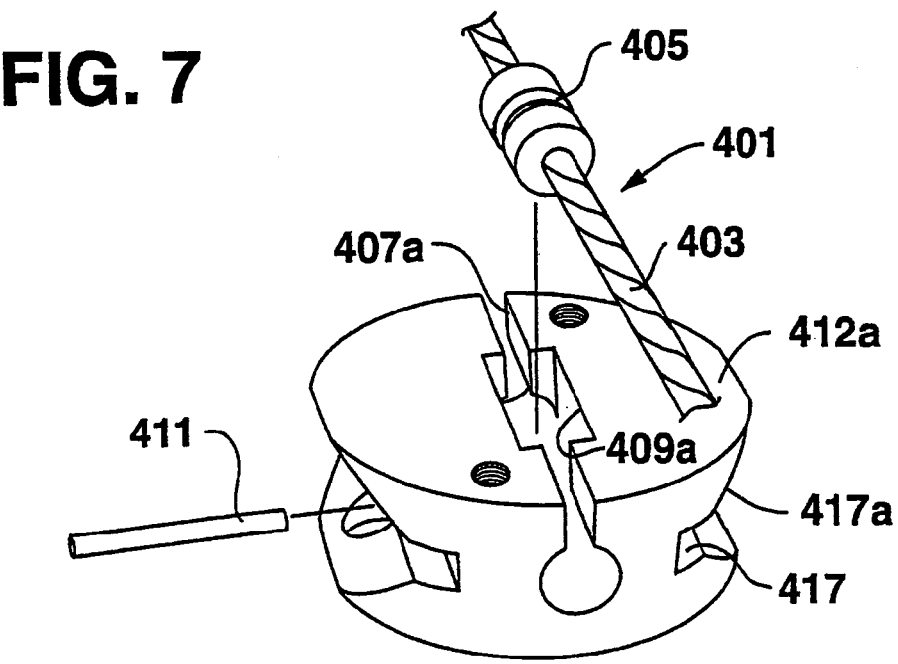
FIG. 7 is an exploded perspective view of an alternative design for a portion of the conveyor of FIG. 1.
Figure 9:
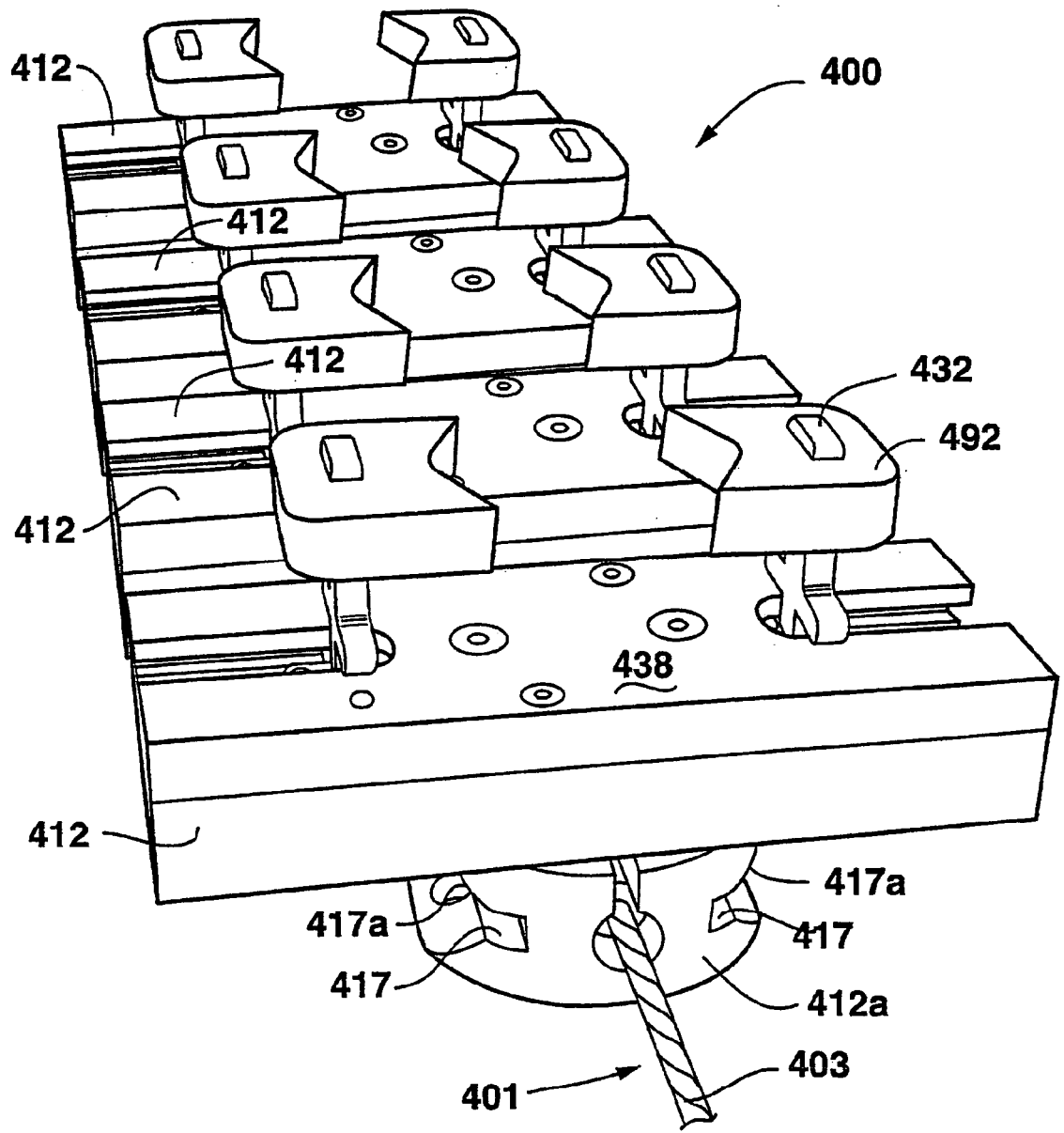
FIG. 9 is a perspective view of a number of links of the conveyor of FIG. 1.

As will be described below, the connection elements may be connected directly to the link bodies 412 or, as shown in FIGS. 6, 7 and 9, the connection elements may be connected to an intermediate member 412a. Link bodies 412 are then connected to intermediate members 412a via screws 413, or any other method of attachment. If desired, intermediate members 412a may be removably attachable to links 412 for purposes of quick change out of main conveyor 400, maintenance, replacement, cleaning, etc. Alternately, intermediate member 412a could simply comprise an extension disposed at the bottom of link 412.

As shown in FIG. 6, intermediate members 412a may comprise substantially cylindrical pucks, and the intermediate members include structure for guiding links 412 along a track. Intermediate members 412a in FIG. 6 include slots 417 having flared edges 417a for guiding links 412 along a track (such as on ramps and off ramps 612 and 614 having extending opposed rails). Other shapes for the track and the structure for following the track are possible within the scope of the invention. Flared edges 417a allow for a certain amount of twisting if the tracks are to be inverted, for example as would be done at inverter 502 and inverter 504, discussed above. Links 412 may thus follow a track to on ramp 612 (on ramp 612 may even be considered a part of the track), at which point links 412 depart the track and attach themselves to rotatable platform 604 while still holding containers C to be filled. After containers C are filled, links 412 disattach themselves from rotatable platform 604 and rejoin the track, by way of off ramp 614. Therefore, links 412 include attaching structure for attaching the links to at least one element along the handling or filling system, in this case the filler 602.

Figure 8:
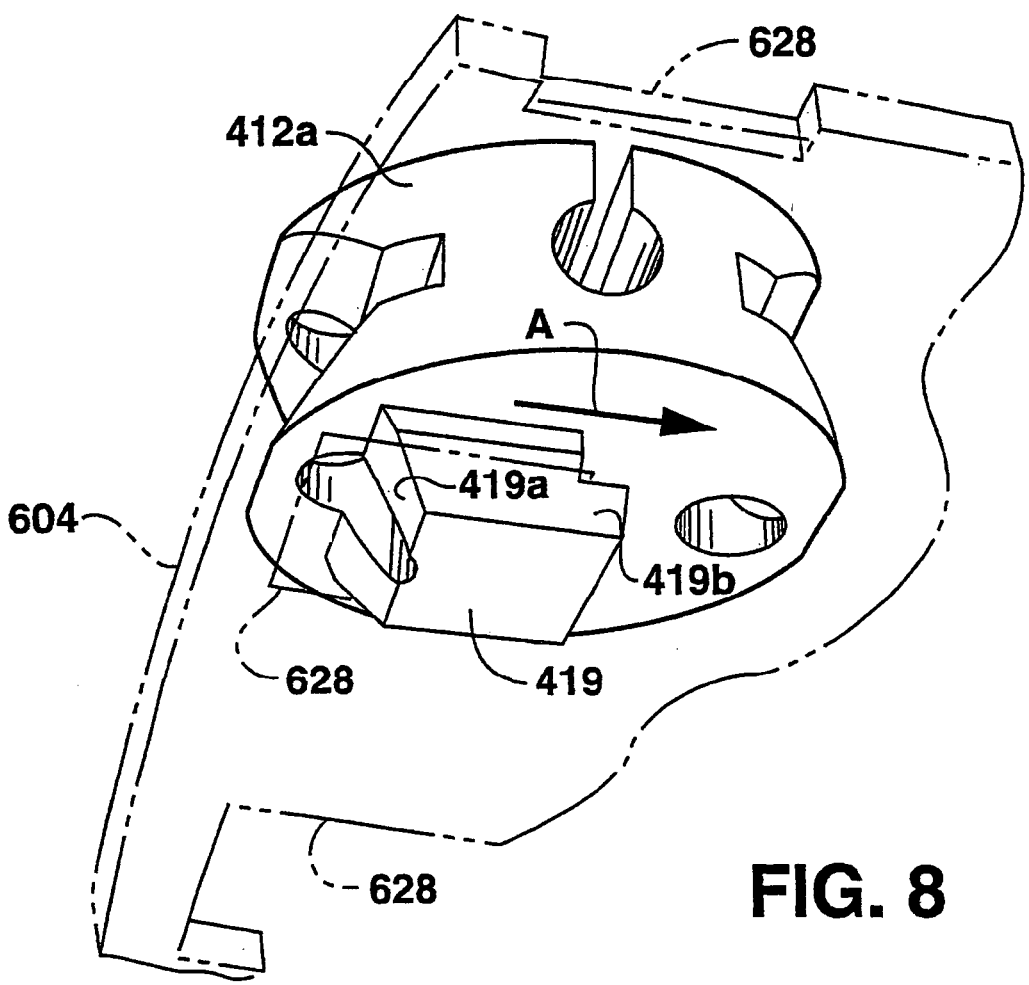
FIG. 8 is a bottom perspective view showing one method of engagement between a portion of the conveyor of FIG. 1 and a portion of the filler station.

As shown in FIGS. 4 and 8, such attaching structure may include cooperating elements disposed on each link 412 and on the filler 602. In FIG. 8, for clarity in illustrating various portions of intermediate member 412a, rotating platform 604 is shown in dotted lines, even though the rotating platform is below the intermediate member. It should be understood that it is also possible within the scope of the invention to attach the intermediate member 412a or links 412 to an underside of a track or rotary platform for article conveying or processing, or even container filling. More particularly, the cooperating elements may include an arm 419 (or securing tab) attached to each link 412 and a plurality of openings 628 disposed on rotating platform 604 of filler 602. Arm 419 may or may not be utilized to assist in conveyor 400 following any track portion of the system. As shown, arm 419 may include a slanted portion 419a for guiding arm 419 into hole 628 and includes a cantilevered portion 419b for securing arm 419 to platform 604. In order to have arm 419 drop into hole 628, it may be desirable to include a curvature in the vertical direction along on ramp 612 to guide arm 419 downward into engagement with opening 628. Tension caused by connection element 401 pulls arm 419 radially inward (relative to axis 610) thereby sliding portion 419b under the bottom of platform 604 adjacent hole 628 (see arrow A in FIG. 7). Similarly, to remove links 412 from platform 604 after filling, off ramp 614 engages links 412 to slide them outward radially (in the direction opposite arrow A in FIG. 7) to move part 419b so as to align with hole 628, and then links 412 move arm 419 upward out of hole 628. Link 412 may then be conveyed downstream of filler 602 for its next processing step.

Other cooperating elements types (not shown) could also be utilized. For example, pins could extend out of platform 604 into bottoms of link 412 or intermediate members 412a. Any such structure for attaching the conveyor to the platform while the container is gripped is within the scope of the invention. Similarly other such structures could be used at other parts of system 100, modified for the particular application.

In use, a robust object handling and/or container filling system can be carried out using various elements of the above structure, as needed for the particular application. For example, perhaps only a rinser and filler could be used with a conveyor, with the conveyor conveying gripped containers for handling therein. In any event, fewer conveyors are needed, and more rapid processing may be possible with gripped conveyors. Elaborate star wheel systems for loading loose containers of a conveyor onto a filler can be eliminated, and the incidence of improperly aligned, broken, or missing containers at filler heads can be reduced. Also, lines may be able to run faster, as well, because containers are not likely to fall over while being affirmatively and continuously gripped. Downstream, multiple cartoners, sorters and the like can take up the output of one filler if the filler is able to operate faster due to the gripping of containers during conveying and filling. Also, gripped containers may run quieter as adjacent containers are less likely to hit each other as opposed to loosely conveyed containers, and damage caused by contact between containers is prevented if the containers are not in contact. Thus, the conveyor, filler and system designs and methods disclosed above, may provide various benefits in various applications. It should be kept in mind that the various disclosed components above are not limited to conveying containers or filling systems.

Figure 12:
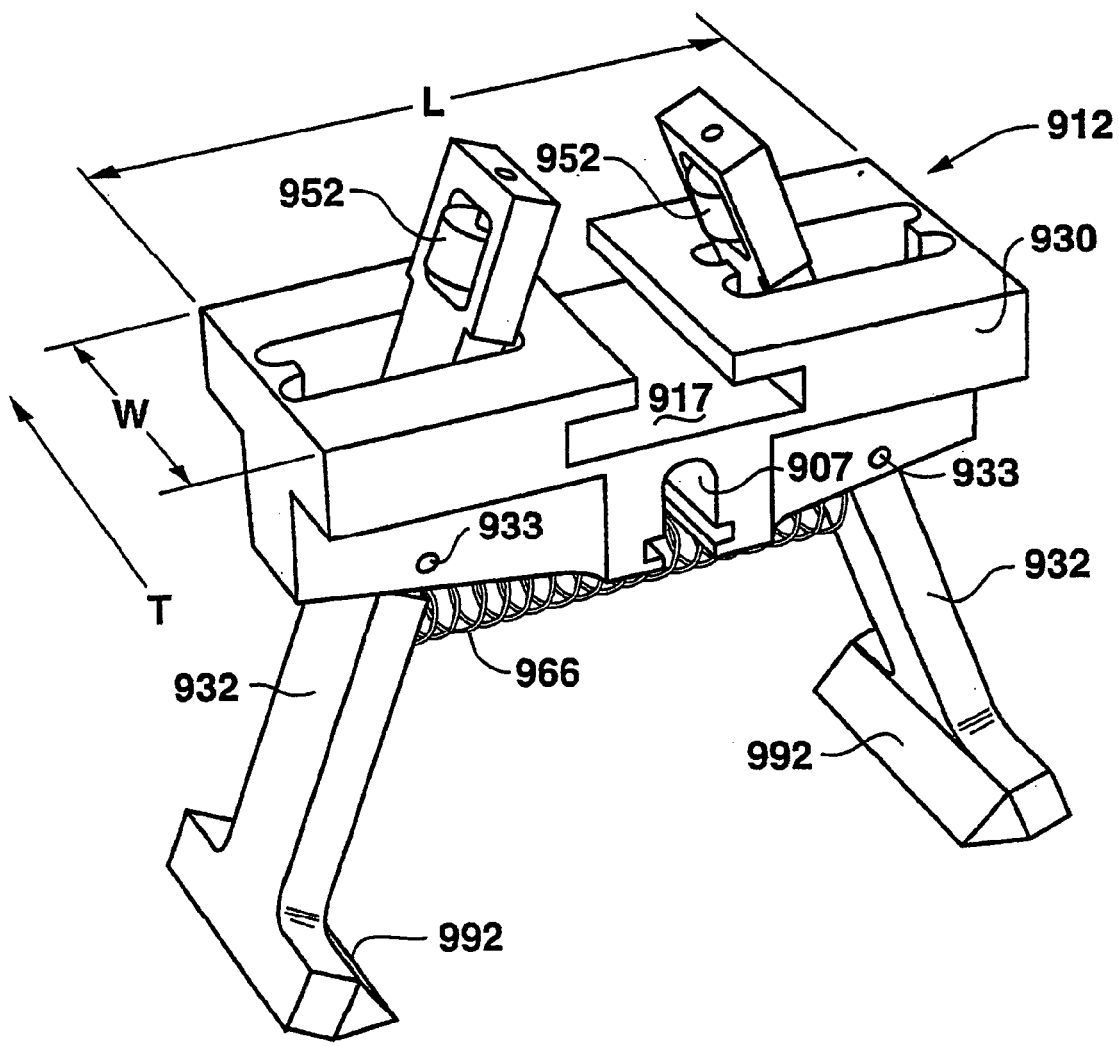
FIG. 12 is a top perspective view of a link of the conveyor of FIG. 11 in a first, opened position.
Figure 13:
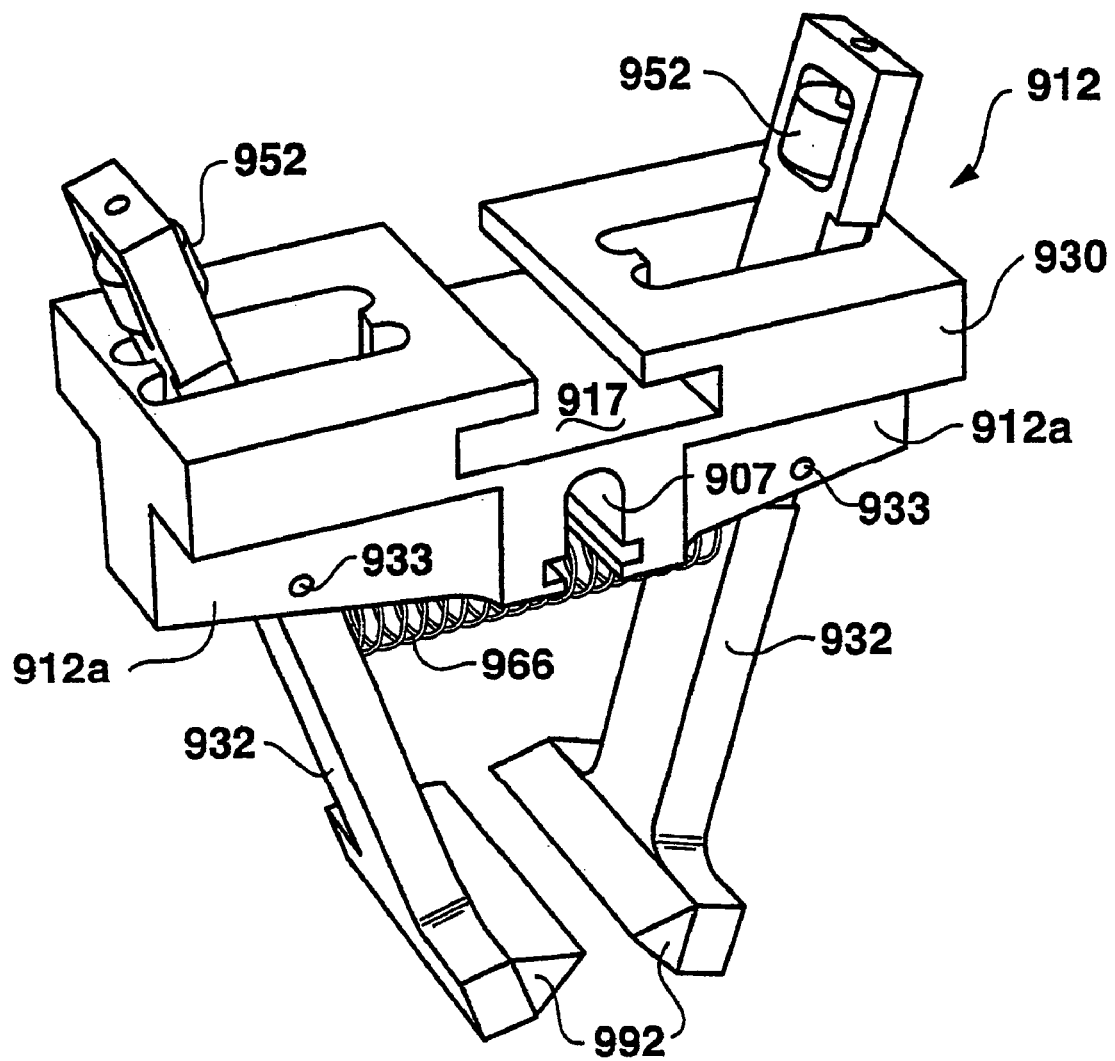
FIG. 13 is a top perspective view of a link of the conveyor of FIG. 11 in a second, closed position.
Figure 14:
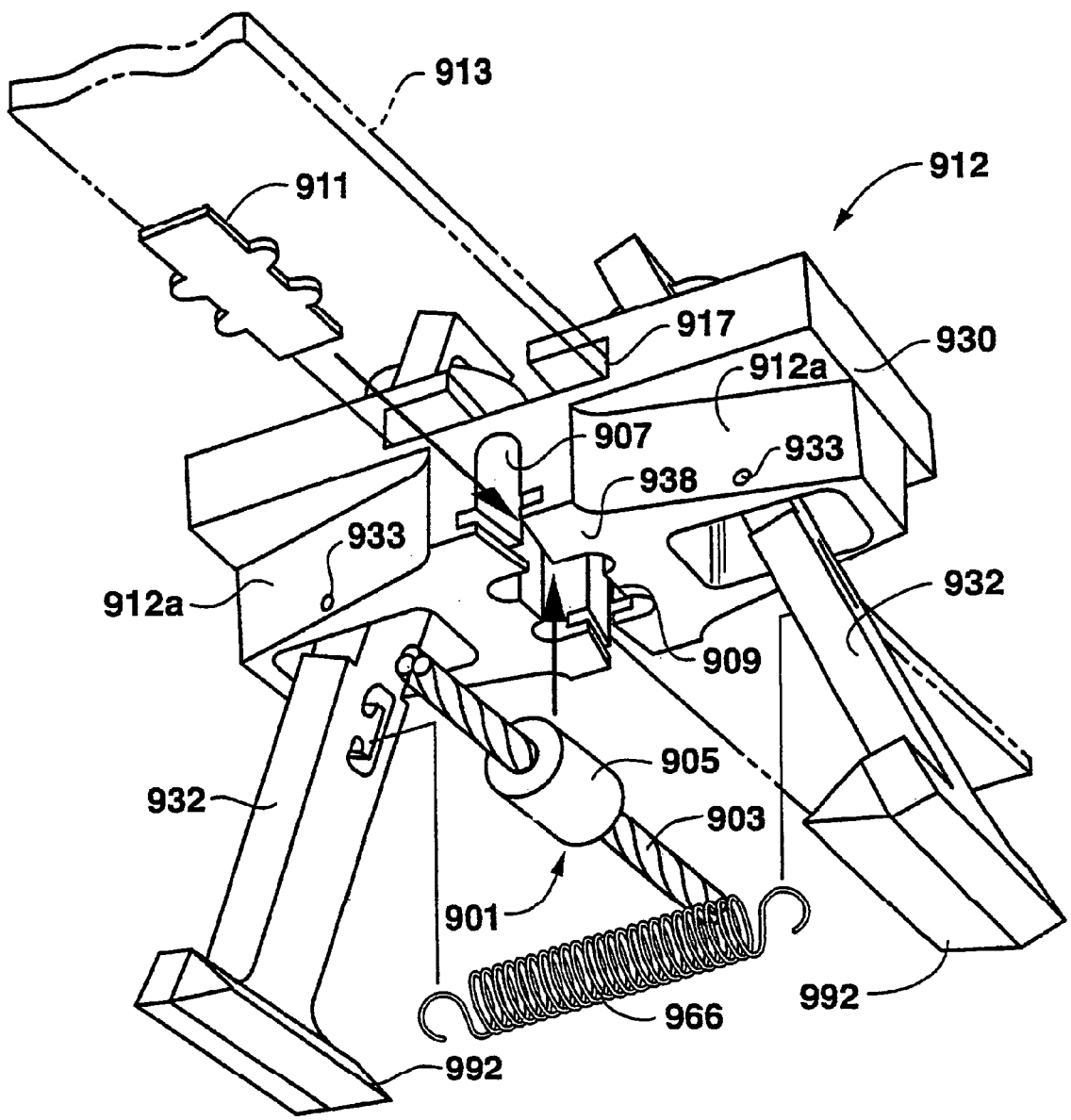
FIG. 14 is a partially exploded bottom perspective view of a link of the conveyor of FIG. 11.
Figure 15:
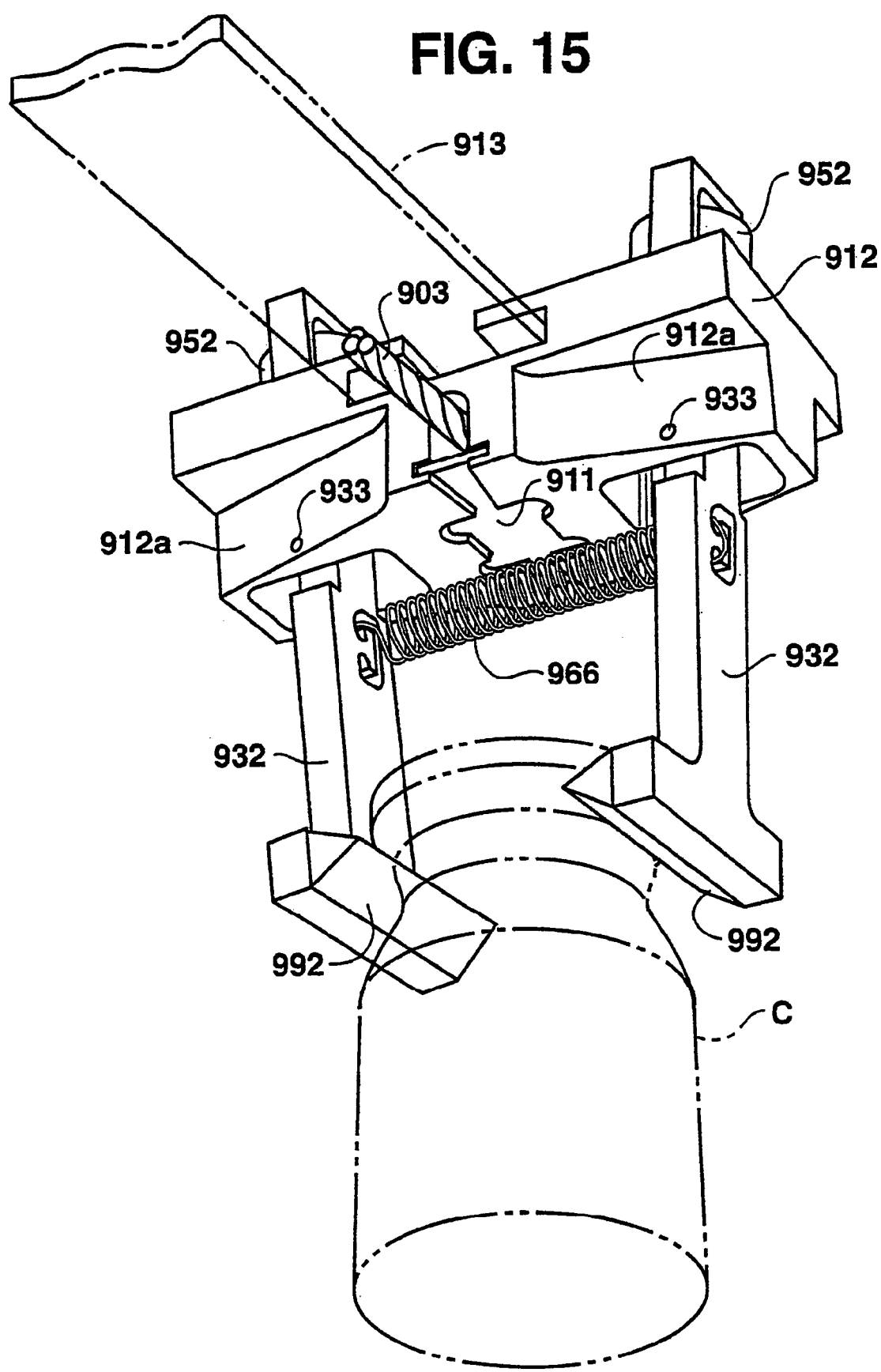
FIG. 15 is a bottom perspective view of a link of the conveyor of FIG. 11 holding an object such as a container.
Figure 16:
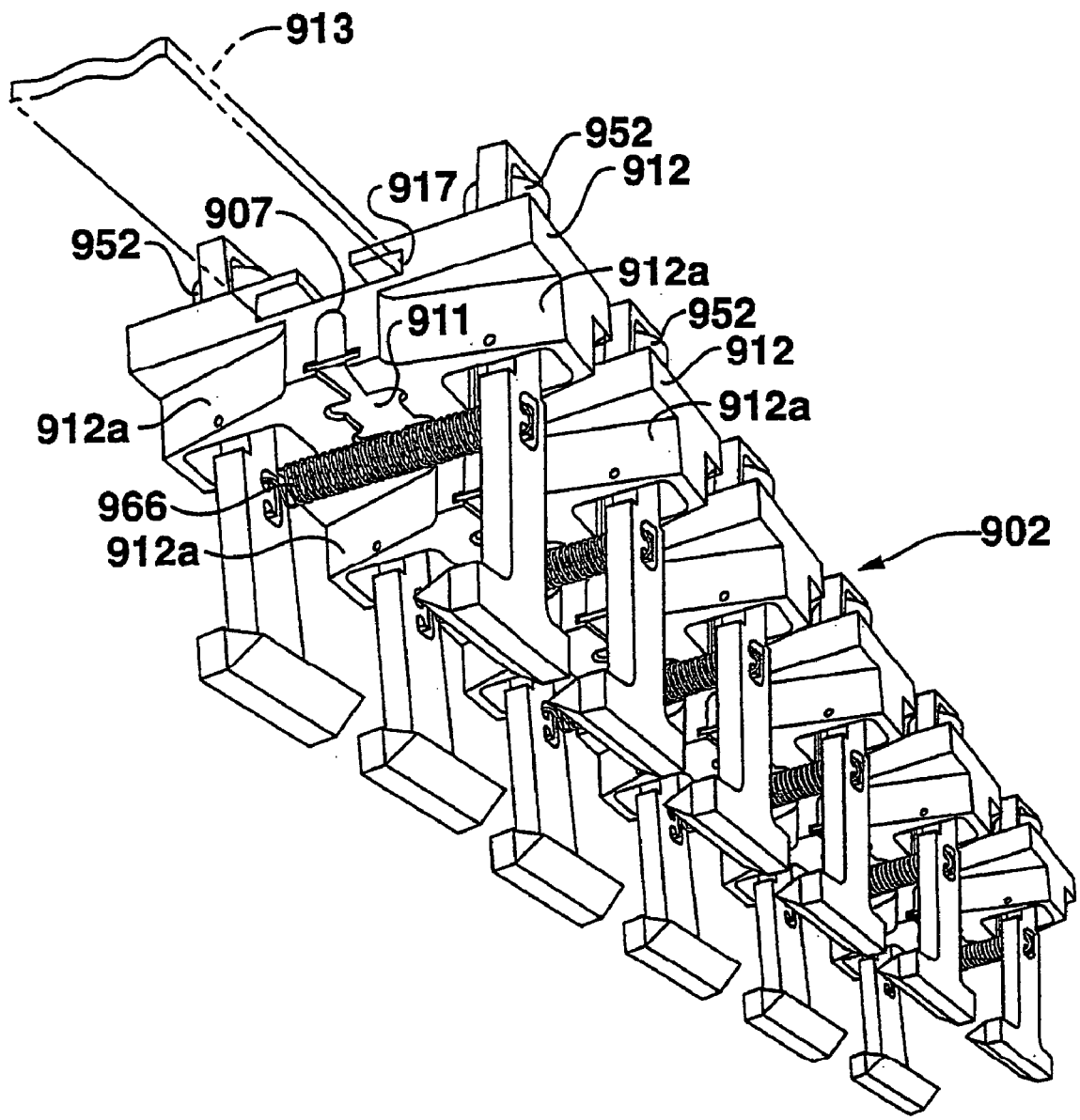
FIG. 16 is a bottom perspective view of a plurality of connected links of the conveyor of FIG. 11 disposed on a track.
Figure 17:
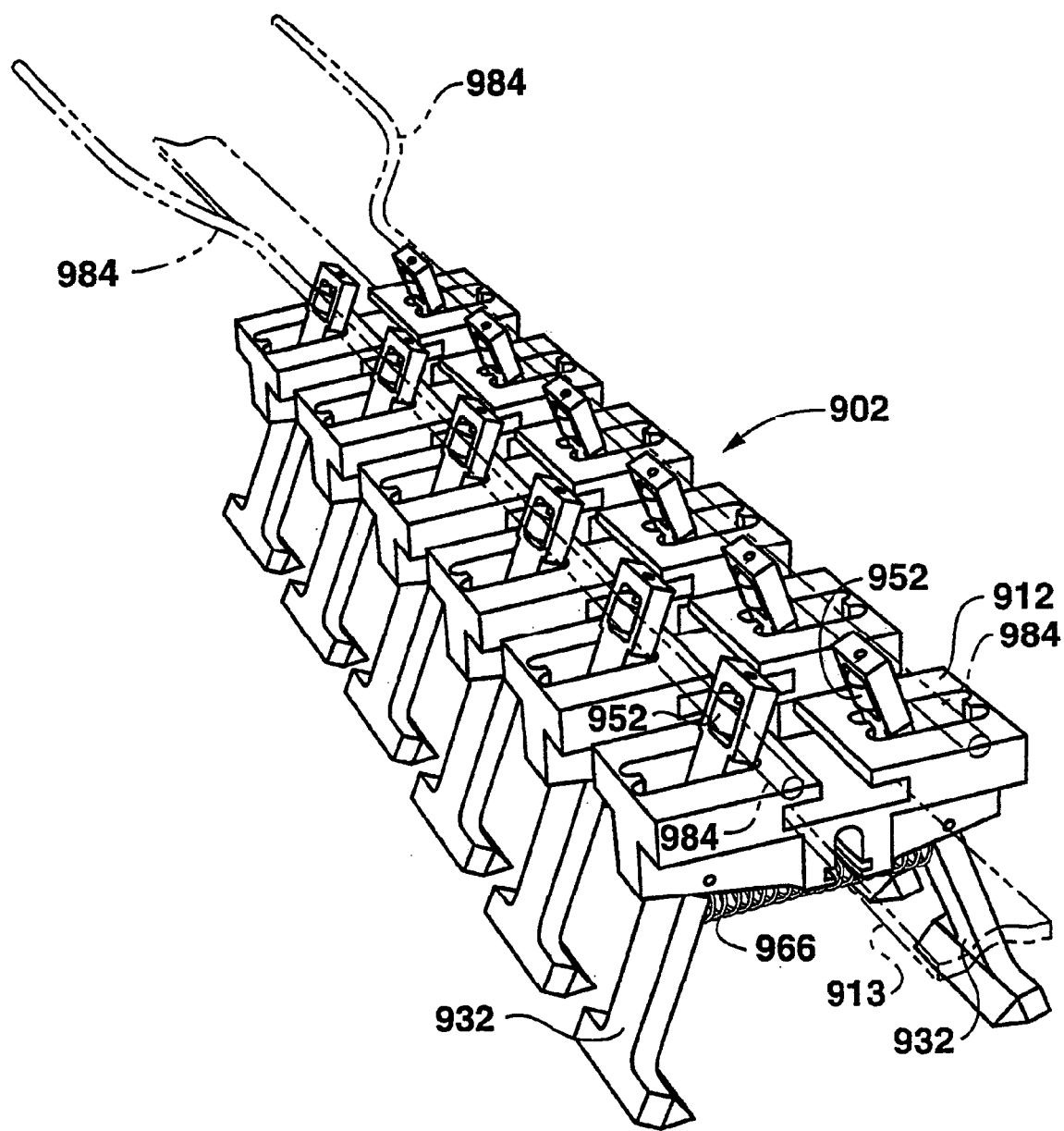
FIG. 17 is a top perspective view of a plurality of connected links of the conveyor of FIG. 11 disposed on a track, and acted upon by a camming rail.

FIGS. 11-18 show another embodiment of a conveyor 910 according to certain other aspects of the invention. As shown, conveyor 910 includes a plurality of connected links 912 for conveying objects such as containers along a direction of transport T. Conveyor 910 may optionally be used to grip objects spaced from or in contact with conveying surfaces 938 of links 912 (FIGS. 14 and 15). Conveyor 910 is thus suited to grip and convey bottles by the neck, either upright or inverted, if desired. However, conveyor 910 could also carry objects sitting on conveying surface 938.

Each link 912 has a length L extending across the direction of transport T and a width W extending along the direction of transport T (see FIG. 12). Each link 912 has a body 930, and may have two opposed gripping members 932, and at least one spring member 966. Cam follower members 952 may be located on one or both of gripping members 932, which are selectively movable between a first, opened position (as shown in FIG. 12) and a second, gripping position (as shown in FIG. 13). The spring member 966 urges the gripping members toward the second, gripping position. Gripping members 932 may thus contact one of the conveyed objects C to hold the object during transport when in the second position (see FIG. 15). Camming members such as cams or, as shown, rails 984 (FIG. 17) may be provided to move gripping members 932 toward the first, opened position against the force of springs 966. Although gripping members 932 are shown as operating independently, if desired, their motions could be more directly tied by use of interacting circular gears, sliders, rack and pinion arrangements, or the like.

The movable gripping members may be attached in various ways. For example, as shown, each link 912 may include two pins 933 around which gripping members 932 pivot. As shown, spring members 966 comprise tension springs. However, if desired, compression springs located on the opposite side of pins 933 could be used, or leaf springs could be substituted as well. The spring constant of spring members 966 can be selected according to the application to as to be able to securely hold the desired object, whether full or empty, in motion and/or traveling around curves. If desired to achieve a certain result, multiple spring members 966 could also be used.

One or both of gripping members 932 may include a flexible adaptor 992 for more securely holding the gripped objects in a particular location relative to link 912. Further, if desired (but not shown), the adaptor 992 or the griping member 932 may be shaped so that adjacent containers C may be gripped "on-centers" with a predetermined spacing for interaction with other machinery (see, e.g., FIG. 11 below). The size and shape of adaptors 992 may be altered to suit the application and/or conveyed objects. Links 912 and/or adaptors 992 may also be particularly configured to allow gripping members 932 to grip bottlenecks, or to grip objects spaced from the links or with the links inverted, as shown.

Gripping members 932 on adjacent links 912 may be connected via connections elements such as a flexible connecting member 901 (FIG. 14). The connection elements are configured so as to allow three-dimensional movement of a given link relative to an adjacent link. As used herein, three-dimensional movement means relative movement between links about three axes: twisting between adjacent links around an axis parallel to the direction of transport, and around two axes perpendicular to the direction of transport (i.e., horizontally and vertically, as oriented. in FIG. 11). If each link grips and conveys one container, the connection elements may allow twisting of approximately 180° or more per foot of member 901.

Flexible connecting member 901 may comprise a braided wire cable 903 made of stainless steel, or any other suitable materials or the like, with mounting members 905 secured to it at given intervals. Mounting members 905 may comprise cylindrical swages, as shown, made of aluminum, stainless steel, or any other suitable material or the like, secured to cable 903 by a set screw, swaging, welding, brazing, or any other reliable manner of attachment. If such a flexible connecting member 901 is used, a groove 907 may be formed in conveying surface 938 of link 912 sized so that cable 903 may be slid into the groove. A retaining portion 909 of groove 907 may be provided to receive mounting member 905. Retaining portion 909 may be a widened portion of groove 907 configured for receiving mounting member 905. If desired a retainer 911 may be slid over top of mounting member 905 and into a slot 913 in body 912 adjacent groove 907 to retain the mounting member in retaining portion 909. Retainer 911 may be a spring-type member having leaf spring type edges if desired to hold it in place. Alternately, a set screw, a pin, etc., may be used to secured mounting member 905 within retaining portion 909. Depending on the arrangement and travel of conveyor 910, a retainer or the like may not be needed, as tension and friction caused by the arrangement and travel may be sufficient to hold link 912 in place on flexible connecting member 901. In the configuration shown, individual links 912 may be removed from flexible connecting member 901 for service, repair, cleaning, or changing of conveyed object or application, if desired. While such removable mounting is not necessary for all aspects of the invention, such arrangement may be useful in certain applications.

As shown, conveyor 910 may include a track 913, links 912 being configured to follow the track. Track 913 may have a T-shaped cross section 915 (see FIG. 11), and each link 912 may includes a T-shaped channel 917 for receiving and following the track. Conveyor 910 may utilize other guides instead of track 913, if desired, and links 912 would be reconfigured accordingly.

Figure 11:
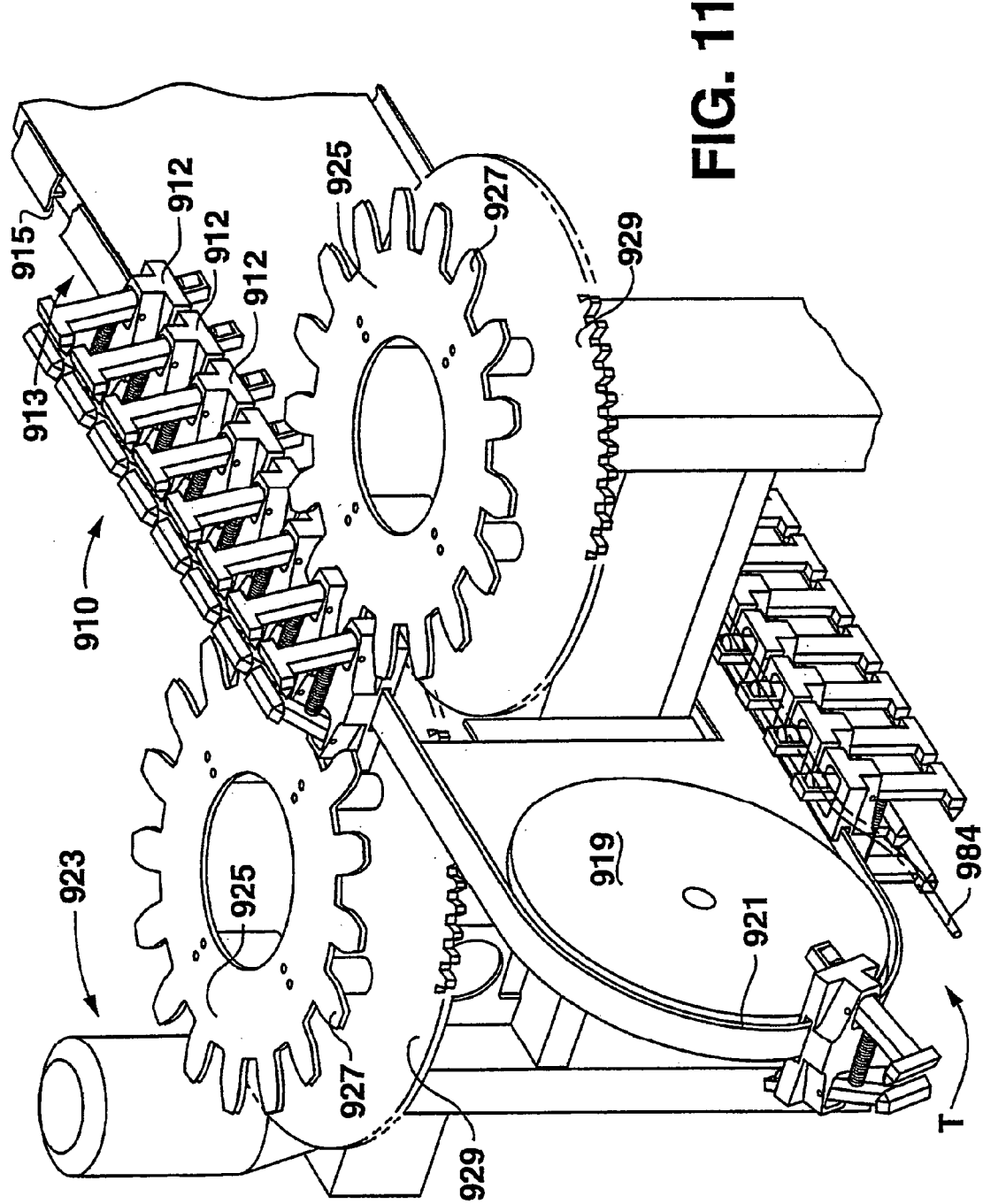
FIG. 11 is a perspective view of an embodiment of a conveyor according to the present invention, optionally including a drive mechanism and track.

Conveyor 910 may also include a rotatable wheel 919 for contacting the links 912 to direct the links around any curves in track 913, such as curve 921 shown in FIG. 11. Use of wheel 919 reduces friction that would be present between links 912 and track 913 along a curve. Such a wheel could also be utilized in non-curved portions of travel as well. Also, track 913 could bend laterally or twist along the direction of travel, if desired. In particular, track 913 could invert before bottles pass through a rinser and then turn back upright.

A drive mechanism may also be provided for driving links 912 in a given direction. As shown, the drive mechanism may comprise a motor and motor control 923, and at least one driven gear 925 having teeth 927. Teeth 927 are configured to fit between adjacent links 912 in a rack and pinion arrangement to drive the links. Links 912 may accordingly include side cut outs 912a configured for receiving teeth 927 of gear 925. The drive mechanism may include two of the driven gears 925 disposed on opposite sides of links 912, and may also include intermediate gears 929 configured to drive gears 925 at a given speed, as well as other intermediate gearing (not shown) between the output of motor 923 and gears 929. Thus, conveyor 910 may be readily driven by direct contact with gears 925.

Alternatively, gears 925 could be replaced with wheels (not shown) that frictionally contact outer ends of links 912. If so, the wheels could have flexible materials about their edges, and/or links 912 could have similar materials, for a secure frictional engagement so as to reliably drive links 912.

Figure 18:
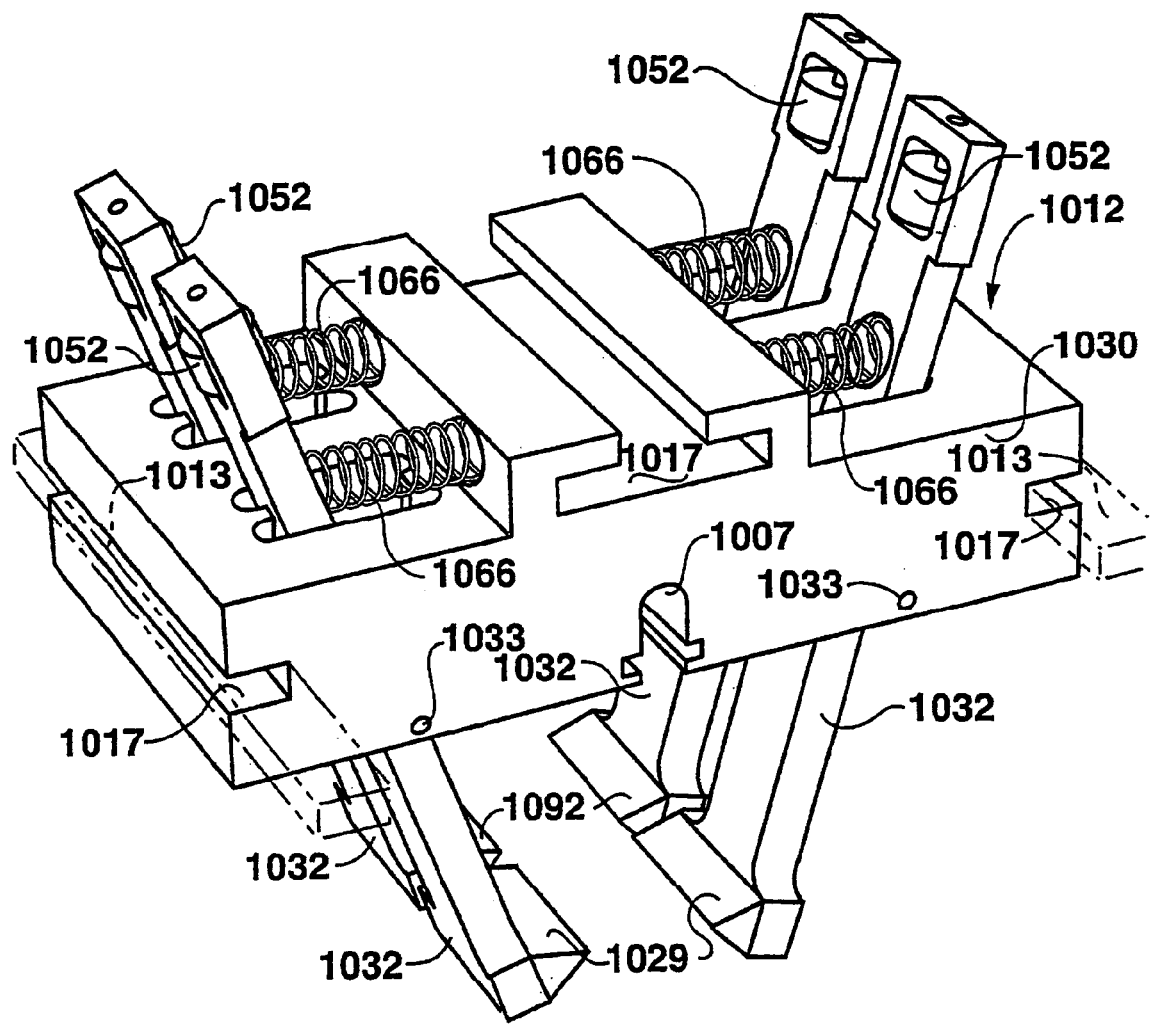
FIG. 18 is a top perspective view of a link for another embodiment.
Figure 19:
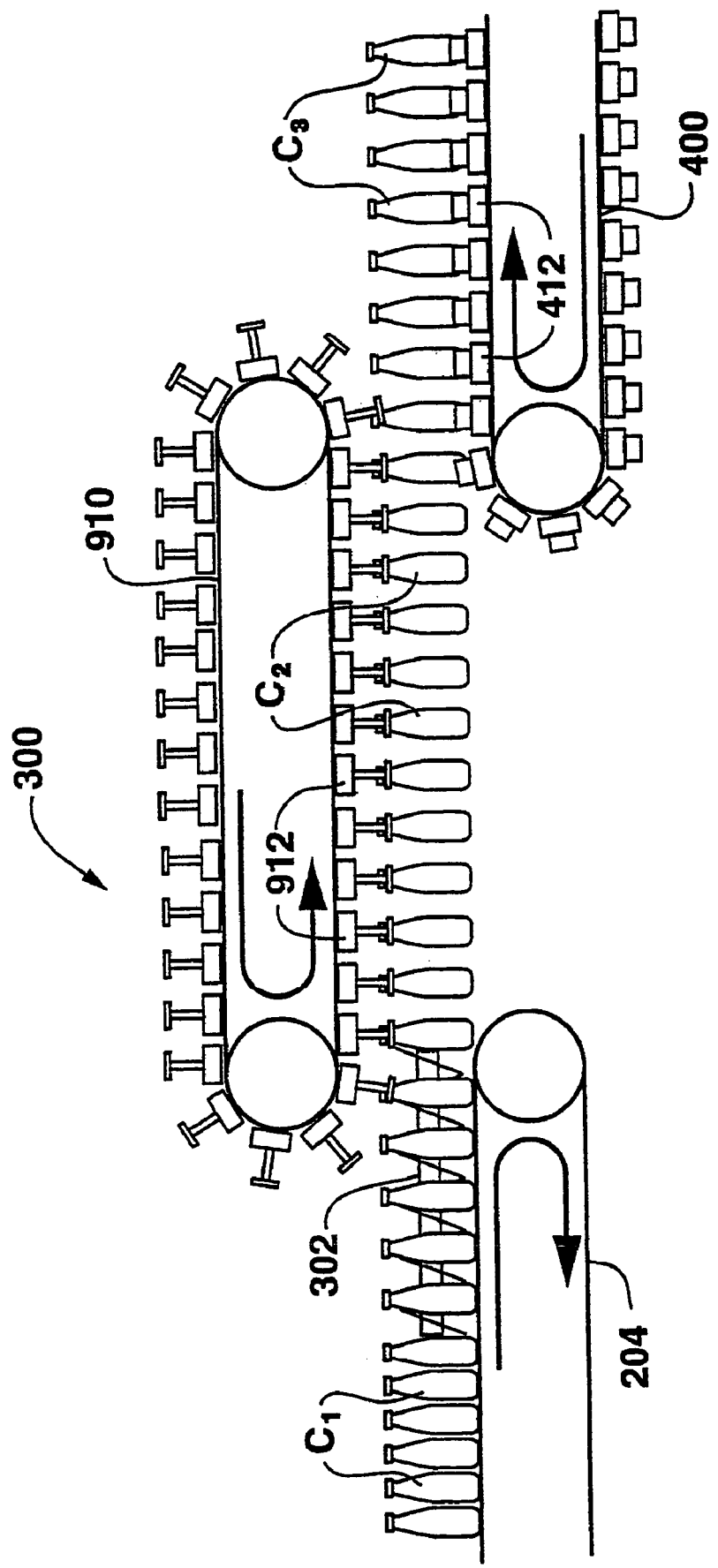
FIG. 19 is a diagrammatical representation of one example of a transfer station including an intermediate gripping conveyor for transferring conveyed articles from a first conveyor to a second conveyor.

FIG. 18 shows a link 1012 for a conveyor according to other aspects of the invention. As shown in this figure, the conveyor includes a plurality of links 1012 each having a body 1030. Four opposed gripping members 1032 are provided on each link, in pairs. As above, a cam follower member 1052 is moveable to selectively move each gripping member 1032 between a first, opened position and a second, gripping position. A spring mechanism 1066 is provided between each pair of gripping members 1032.

Links 1012 are similar to links 912 in many ways. However, links 1012 have two pairs of gripping members 1032 per link, rather than one. As above, gripping members 1032 may include flexible adaptors 1092, which may be made of material such as plastic, rubber, or the like.

Spring members 1066 are compression springs, as above, to urge the gripping members toward the second, closed position. A cam member (not shown) may contact each cam follower member 1052 to move gripping members 1032 in the opposite direction. Of course, the position of the spring member and/or cam member could be reversed so as to urge gripping members 1032 in opposite directions. Also, the compression spring members could be replaced with tension springs on the opposite side of pivot pins 1033, or with leaf springs. As with embodiments above, links 1012 could be modified in various other ways, such as by modifying the adaptor 1092, etc.

Links 1012 may include slots 1017 for receiving a track, which may comprise two opposed rails (not shown). Also, links may include a T-shaped slot 917, as above. Either way, links 1012 may be guided along the track. As above, links 1012 may be connected via a flexible connector such as a wire cable, or other structures, depending on the application.

Aspects of the designs of FIGS. 11-18 may be utilized in combination with aspects of the designs of FIGS. 1A-10. For example, the conveyors of FIGS. 11-18 may be used to grip and convey articles through multiple stations of a processing system, which may include a filler station. As shown in FIG. 19, top gripping conveyor 910 may be utilized as part of a transfer station 300 having one or more timing screws 302, as described above. Therefore, a short top gripping conveyor 910 such as shown in FIGS. 11-18 may be utilized in the system of FIGS. 1A and 1B to remove conveyed objects $C_1$ from conveyor 204, and grip the objects $C_2$ in links 912 as spaced by screw 302, and then transfer the objects $C_3$ to conveyor 400 on spaced links 412. Camming members (not shown) selectively open and close the grippers of conveyor 910 to grip and release the containers. Similarly, other camming members (not shown) open grippers on links 412 to allow the containers to be handed off from conveyor 910 to conveyor 400. The speed and spacing of links 912 and 412 and screw 302 should be controlled with sensors, such as optical or electronic devices, so as to ensure synchronized operation. A conventional programmable logic controller could be used to drive conveyor and timing screw motors based on sensor feedback. Such structure would be beneficial in aligning the conveyed objects at timing screw 302 while gripped from above so that gripping portions of the downstream conveyor 400 do not interfere with the screw. Then, the top gripping conveyor could pass control to main conveyor 400, all controlled by simple cams and followers. If a timing screw or other such objects that might be interfered with are not present near the moveable portions of the gripping conveyor, then it may be suitable to simply cam open grippers of the gripping conveyor to directly pass the conveyed articles to the next station, conveyor, etc. However, a combination of a top gripping conveyor and bottom gripping conveyor, in either order, can have various utilities in article handling and container filling.

Also, the conveyors of FIGS. 11-18 could be used to grip container bases rather than necks and still be used in the system of FIGS. 1A and 1B. If so, certain modifications would be possible, such as modifications to the track and adding cooperating elements to attach the conveyor links to processing stations such as the filler.

Figure 20:
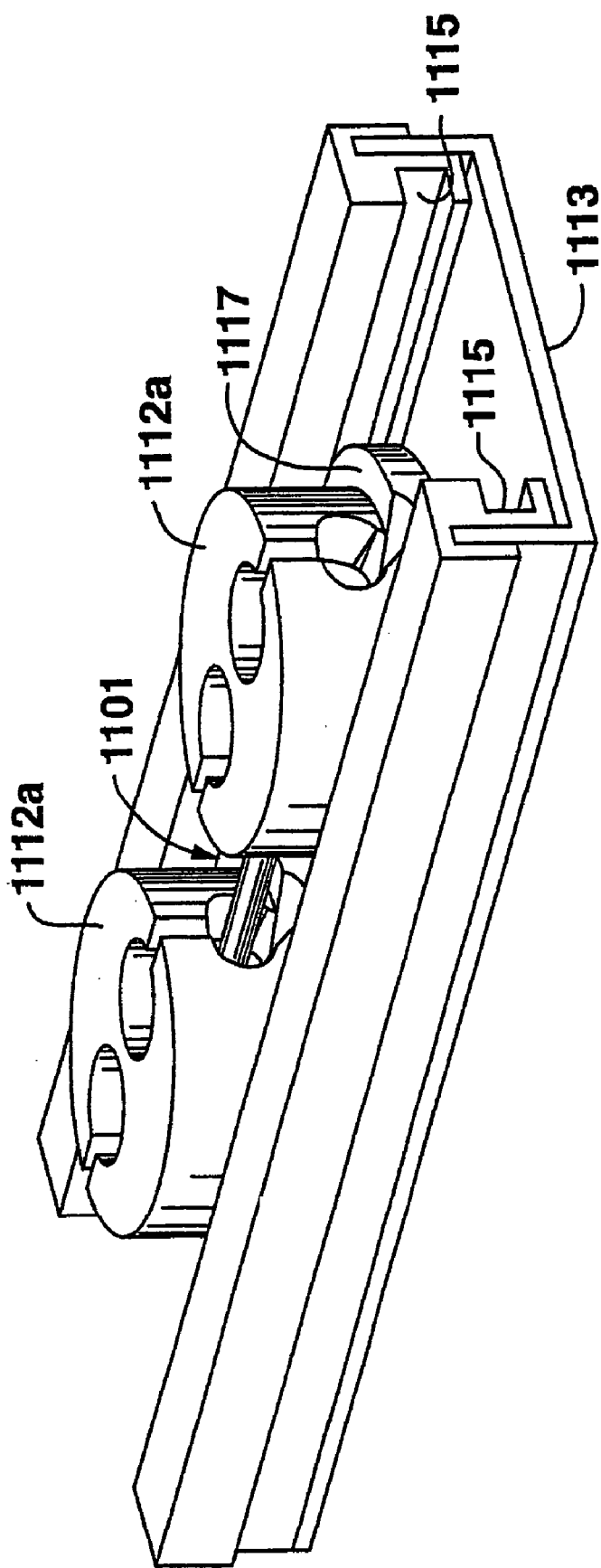
FIG. 20 is a perspective view of a portion of another conveyor according to certain aspects of the invention.
Figure 21:
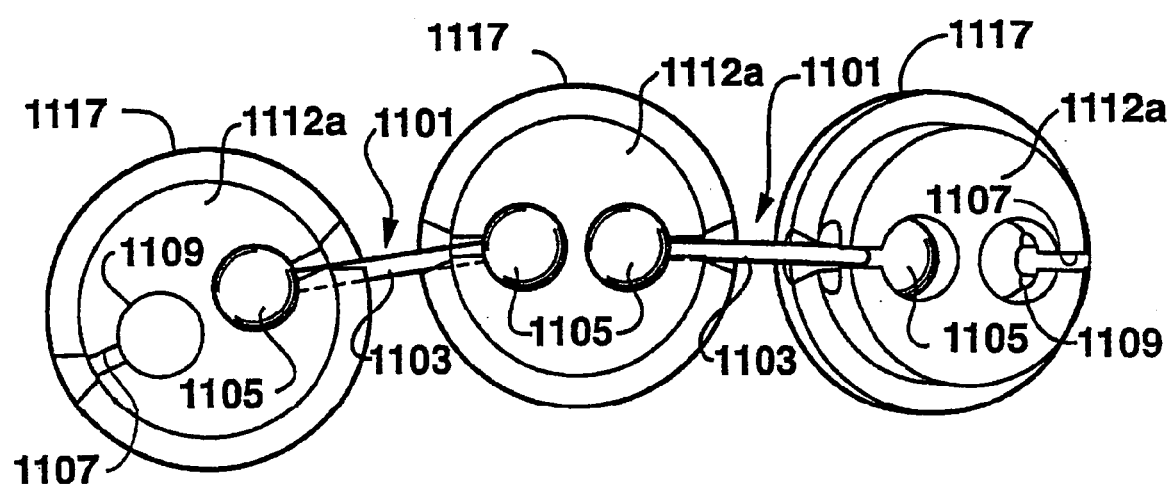
FIG. 21 is a top view of a portion of a conveyor as in FIG. 20.
Figure 22:
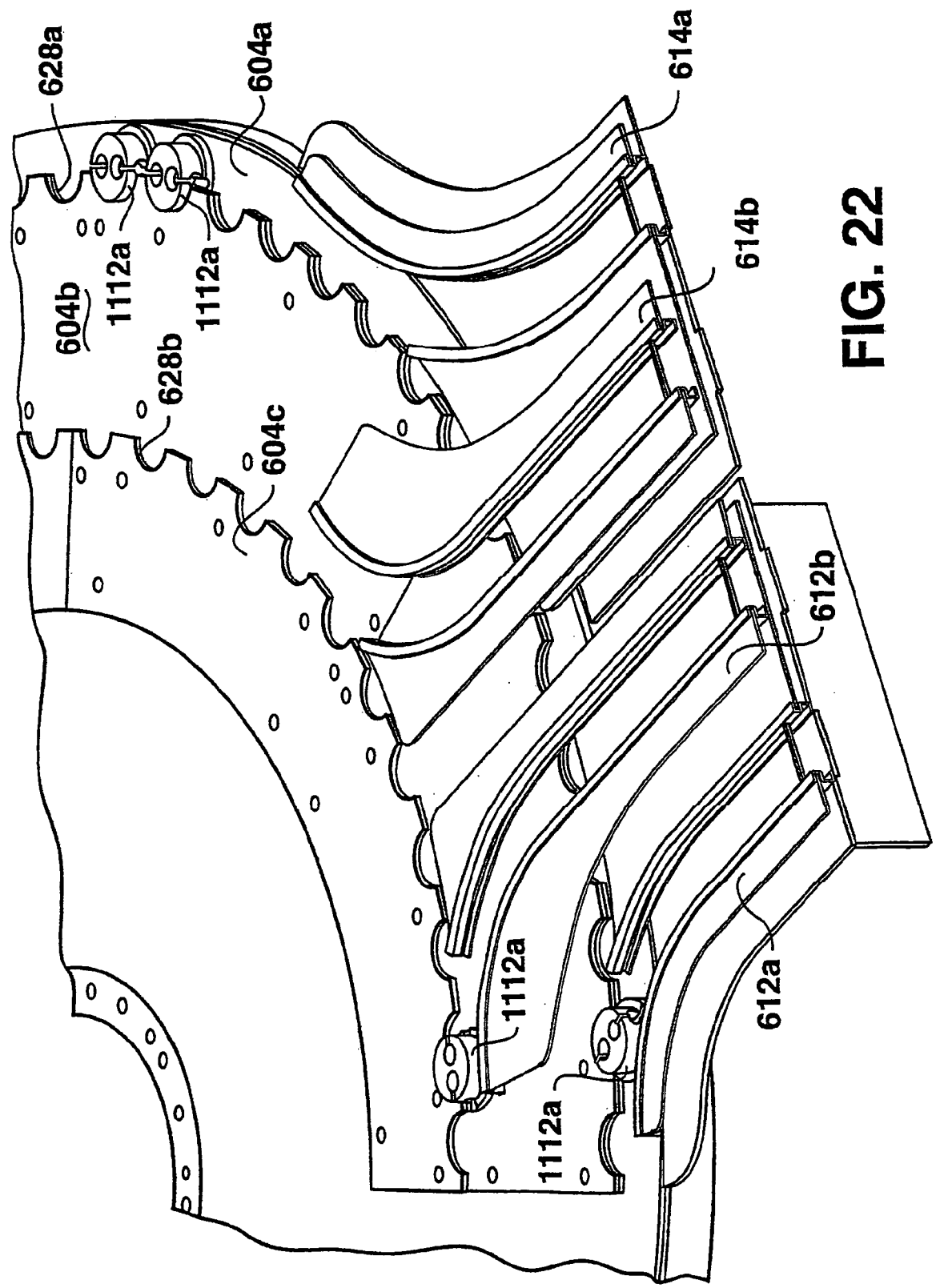
FIG. 22 is a perspective view of a portion of a modified rotary filling machine and modified track ends for use with a conveyor as in FIG. 20.

FIGS. 20-22 show another alternate construction of a conveyor, along with certain corresponding system components such as a track, a filler portion, etc. FIG. 20 shows an alternative track 1113 including dual channels 1115 facing each other. An alternate form of intermediate element 1112a is shown having an extending flange 1117 that slides within channels 1115. No arm, such as arm 419 above, is provided on a bottom surface of intermediate element 1112a.

As shown in FIG. 21, a connection element 1101 is provided for connecting adjacent intermediate elements 1112a into a conveyor. Links (not shown), such as any of the links discussed above, may be attached in various ways to intermediate elements 1112a to form a conveyor. Connection element 1101 comprises a barbell shaped element having a center rod 1103 and two larger end pieces 1105. End pieces 1105 comprise spherical members that are seated within openings 1109 in intermediate elements 1112a. Slots 1107 extending from openings 1109 allow for assembly and a certain amount of play between adjacent intermediate elements 1112a to provide for three-dimensional movement between adjacent intermediate elements 1112a, as discussed above.

Use of the structure of FIGS. 20 and 21 allows for an alternate form of a filler. As shown in FIG. 22, a slight modification has been made to a portion of filler 602 and the on and off ramps. As shown in FIG. 22, filler 602 includes three rotating platforms 604a, 604b, and 604c. Platform 604a is located vertically lowest and platform 604c is located vertically highest. On ramps 612a and 612b (for dual conveyors) and off ramps 614a and 614b (also for dual conveyors) are substantially flat and slide intermediate elements 1112a substantially horizontally onto rotating platforms 604a and 604b. Platforms 604b and 604c include receiving elements 628b in the shape of indentations for receiving sides of intermediate elements 1112a. As above, conveyors are fed to filler 600 along tracks (not shown other than the on and off ramps), at which point the conveyors depart the tracks and are gripped by the filler in registration with filling heads (not shown in FIG. 22). Each indentation 628b is disposed for placing a conveyed container in registration with a filler element. If desired, intermediate elements 1112a could include indentations and platforms 604a-c could include mating protrusions, or other equivalent cooperating structures. Tension between adjacent links caused by the connection of connection elements 1101 keeps the links tightly held against indentations 628b for conveying containers around the filler for filling. Use of the intermediate elements 1112a allows for the direct sliding (without any vertical component) to place links in location for filling containers, as contrasted with use of intermediate elements 412a having arm 419. In certain situations such structure could provide beneficial results in terms of container stability. Again, such structure need not be used in a dual filler configuration, at which point elements 612b, 614b and 604c could be eliminated. Numerous modifications and variations are possible for the device of FIGS. 20 and 21, incorporating various of the teachings of previous figures and embodiments.

The conveyors and links of FIGS. 1A-22 have particular usefulness in picking up and moving objects including containers, either by their necks or their bases. The objects can be inverted, if desired, to pass them through a rinser or a labeler, or to allow them to drain. Moving lightweight plastic containers is also reliably performed, as the bottles are securely gripped during travel. Tipping over of such lightweight containers is not an issue when the containers are gripped from above. Therefore, it is possible in some applications to move the conveyed objects very rapidly.

The conveyors and links of FIGS. 1A-22 may be modified in various ways to incorporate teachings of the embodiments of other embodiments within FIGS. 1A-22. It should be understood that various other modifications and combinations of the above embodiments are contemplated and are also within the scope of the present invention. For example, spring members shown as compression springs could be substituted with tension springs, and vice versa, with corresponding modifications of other related elements. In such cases, movement of cam followers and cams from one side of a link to the other may be required, among other changes. Also, each link may include only one or multiple gripping members. Each gripping member may include only one or multiple gripping arms. Multiple gripping arms may be actuated by a single slider on a link, or each gripping arms may be actuated by a single slider on a link, or each gripping arm may have its own slider. The shape of the link body, the method of attachment to the drive mechanism, the type of drive mechanism, and the disclosed uses of the conveyors herein are also examples only, and no limitations should be drawn from this disclosure. Thus, the present invention contemplates that any and all such subject matter is included within the scope of the present invention.

What is claimed is:

1. A conveyor suitable for conveying containers along a transport direction to and from a filler, the filler having filler heads and cooperating elements including indentations, the conveyor comprising:
   a track extending along a conveying path, the track being formed in at least two portions, a first portion terminating at an input section of the filler and a second portion beginning at an output section of the filler;
   a plurality of connected links, each link having a length extending across the direction of transport and a width extending along the direction of transport, each link having a conveying surface for conveying one or more of the containers, and each link defining mating structure for following the track along the conveying path and attaching structure for attaching the links to the filler;
   connection elements connecting the links so as to form a conveyor; and
   the mating structure configured for guiding the links along the first track portion and to the filler, the attaching structure configured for attaching the links to the filler for filling the containers, the attaching structure including cooperating elements disposed on each link, each link including a mating portion configured for seating within one of the indentations on the filler, the mating structure configured for guiding the containers off the filler and onto the second track portion after the containers are filled.

2. The conveyor of claim 1, wherein the connection elements include a cable.

3. The conveyor of claim 2, wherein the cable is configured with a plurality of mounting members thereon, the mounting members spaced at given intervals, the mounting members being securable to the links to attach the links to the cable.

4. The conveyor of claim 2, wherein the connection elements are a plurality of joining elements extending between adjacent links, each joining element joining two of the links.

5. The conveyor of claim 2, wherein the connection elements and links are configured to allow three-dimensional movement of a given one of the links relative to an adjacent link.

6. The conveyor of claim 2, wherein the cooperating elements include an arm disposed on each link.

7. The conveyor of claim 2, wherein the attaching structure is configured for attaching the conveyor to the filler so that the containers are in registration with the filler heads of the filler.

8. The conveyor of claim 2, wherein each link includes at least one movable gripper for gripping one of the containers.

9. The conveyor of claim 8, wherein the conveyor is configured to grip and hold the container with the container located substantially below the links.

10. A conveyor suitable for conveying containers along a transport direction to and from a filler, the filler having filler heads and cooperating elements, the conveyor comprising:
    a track extending along a conveying path, the track being formed in at least two portions, a first portion terminating at an input section of the filler and a second portion beginning at an output section of the filler;
    a plurality of connected links, each link having a length extending across the direction of transport and a width extending along the direction of transport, each link having a conveying surface for conveying one or more of the containers, and each link defining mating structure for following the track along the conveying path and attaching structure for attaching the links to the filler;
    connection elements connecting the links so as to form a conveyor, the connection elements including a cable; and
    the mating structure configured for guiding the links along the first track portion and to the filler, the attaching structure configured for attaching the links to the filler for filling the containers, the mating structure configured for guiding the containers off the filler and onto the second track portion after the containers are filled.

11. The conveyor of claim 10, wherein the cable is configured with a plurality of mounting members thereon, the mounting members spaced at given intervals, the mounting members being securable to the links to attach the links to the cable.

12. The conveyor of claim 10, wherein the connection elements and links are configured to allow three-dimensional movement of a given one of the links relative to an adjacent link.

13. The conveyor of claim 10, wherein the attaching structure includes cooperating elements disposed on each link.

14. The conveyor of claim 13, wherein the cooperating elements on the link include an arm disposed on each link.

15. The conveyor of claim 13, wherein the cooperating elements include a mating portion of a link for reception in one of the cooperating elements of the filler.

16. The conveyor of claim 10, wherein the attaching structure attaches the conveyor to the filler so that the containers are in registration with the filler heads of the filler.

17. The conveyor of claim 10, wherein each link includes at least one movable gripper for gripping one of the containers.

18. The conveyor of claim 17, wherein the conveyor is configured to grip and hold the container with the container located substantially below the links.

19. A conveyor suitable for conveying containers along a transport direction to and from a filler having filling heads, the conveyor comprising:
    a track extending along a conveying path, the track being formed in at least two portions, a first portion terminating at an input section of the filler and a second portion beginning at an output section of the filler;

a plurality of connected links, each link having a length extending across the direction of transport and a width extending along the direction of transport, each link having a conveying surface for conveying one or more of the containers, and each link defining mating structure for following the track along the conveying path and attaching structure for attaching the links to the filler;

connection elements connecting the links so as to form a conveyor; and the mating structure configured for guiding the links along the first track portion and to the filler, the attaching structure configured for attaching the links to the filler for filling the containers, the attaching structure attaching the conveyor to the filler so that conveyed objects are in registration with the filler heads of the filler, the mating structure configured for guiding the containers off the filler and onto the second track portion after the containers are filled.

20. The conveyor of claim 19, wherein the connection elements include a cable.

21. The conveyor of claim 19, wherein the connection elements are a plurality of joining elements extending between adjacent links, each joining element joining two of the links.

22. The conveyor of claim 19, wherein each link includes at least one movable gripper for gripping one of the containers.

* * * * *